United States Patent [19]

Blattman et al.

[11] Patent Number: 4,605,922

[45] Date of Patent: Aug. 12, 1986

[54] INTRUSION DETECTOR

[75] Inventors: Daniel A. Blattman; Harold G. Middleton, both of King County, Wash.

[73] Assignee: Racon, Inc., Seattle, Wash.

[21] Appl. No.: 650,820

[22] Filed: Sep. 14, 1984

[51] Int. Cl.[4] .............................................. G08B 13/18
[52] U.S. Cl. .................................................... 340/552
[58] Field of Search ......................................... 340/552

[56] References Cited

U.S. PATENT DOCUMENTS

| 4,010,459 | 3/1977 | Pontoppidan et al. | 340/552 |
|---|---|---|---|
| 4,187,501 | 2/1980 | Olesch et al. | 340/552 |
| 4,191,953 | 3/1980 | Woode | 340/552 |

OTHER PUBLICATIONS

Packet of Information about Racon Inc., "Microwave, Racon Inc.".
"Spread-Spectrum Signal Acquisition: Methods and Technology", Rappaport, Stephen S. et al., *Communications Magazine*, Jun. 1984, vol. 22, No. 6, pp. 6–21.
"Why is the Army Interested in Spread Spectrum?", Sass, Paul F., *Communications Magazine*, Jul. 1983, vol. 21, No. 4, pp. 23–25.
"A New Wideband HF Technique for MHz-Bandwidth Spread-Spectrum Radio Communications," Perry, Bernard D., *Communications Magazine*, Sep., 1983, vol. 21, No. 6, pp. 28–36.
"Cellular Mobile Technology: the Great Multiplier," Cooper, George, et al., *Spectrum Magazine*, Jun. 1983, pp. 30–37.
"Spread-Spectrum Access to Mixed Voice-Data Local Area Networks," Elhakeem, Ahmed K. et al., *IEEE Journal on Selected Areas in Communications*, Dec. 1983, vol. SAC-1, No. 6, pp. 1054–1069.

*Primary Examiner*—Glen R. Swann, III
*Attorney, Agent, or Firm*—Seed & Berry

[57] ABSTRACT

An intrusion detector system with a transmitter having a clock operating at a selected frequency, a pseudorandom code sequence generator for generating one of a selected number of codes, a modulator for spread-spectrum modulating an electromagnetic signal with the generated pseudorandom code sequence signal, and an antenna for transmitting the modulated signal through a zone of protection; and a receiver having an antenna, a demodulator for detecting and demodulating the modulated signal to recover the transmitter pseudorandom code sequence signal, a clock operating at a frequency corresponding to the transmitter clock, a pseudorandom code sequence generator for generating one of a selected number of receiver code signals corresponding to the transmitter code signals, a detector for comparing the received code signal to the receiver code signal and generating a detection signal proportional to the signal amplitude of the received code signal when locked in phase with the receiver code signal, a phase detector for detecting the phase difference between the two code signals, a control for phase synchronizing the two code signals, and a monitor for detecting and signalling changes in the detection signal resulting from entry of movement of an intruder in the zone of protection.

52 Claims, 5 Drawing Figures

INTRUSION DETECTOR

DESCRIPTION

1. Technical Field

The present invention relates to bistatic intrusion detectors.

2. Background Art

In the past, microwave outdoor line sensor systems used for perimeter security have utilized an amplitude-modulated microwave carrier transmitted through a zone of protection to detect the entry or movement of an intruder within the zone. A receiver positioned across the zone from the transmitter received the microwave carrier and demodulated the received signal to produce the modulation signal of the transmitter. Conventionally, the modulation signal is a constant, low frequency triangular or square wave. The output of the demodulator is an audio frequency having the same frequency as the transmitter modulation signal and an amplitude which varies with the entry or movement of an intruder in the zone of protection resulting from beam break or multipath signal variations. In response to such changes in the amplitude of the received signal, the system indicates an alarm.

One disadvantage of such conventional systems is the use of a simple amplitude modulation to produce a relatively narrow bandwidth signal and the use of a relatively wide band receiver with a phase lock to adjust the frequency of the receiver to that of the received signal. The frequency of operation of the transmitter modulator can be easily determined; and with relatively simple equipment, a false signal can be generated and transmitted to the receiver of the system. The false signal can be gradually increased in amplitude to replace the signal of the transmitter of the system. The phase-lock mechanism of the receiver will lock on the replacement false signal and permit the intruder to disable the transmitter of the system and to gain entry and move through the zone of protection without detection.

Another disadvantage of such conventional systems is the cross-talk which occurs between a plurality of sensor systems operating in the same general vicinity. The transmitted signal from one system can interfere and cause a false alarm of another system. To avoid this problem, some conventional systems use time sharing to avoid more than one transmitter transmitting at the same time. This requires control lines interconnecting a master controller with each transmitter and each receiver. This increases cost and vulnerability, and decreases reliability. Alternately, other conventional systems use differing frequencies for each system, but the number of available frequencies is limited, and operating each system at a different frequency has inherent problems.

Furthermore, the power spectra of the transmitted system has a high density, making hiding of the transmitted signal impossible and allowing its easy detection.

It will therefore be appreciated that there has been a significant need for an intrusion detector system with improved protection against compromise and that allows selective addressing of numerous systems operating in the same vicinity. The system should provide a low-density power spectra for hiding of the transmitted signal. The intrusion detector system should have low power consumption and have means for security personnel to aurally verify targets. The system should also be substantially immune to jamming with conventional narrow band jamming equipment. The present invention fulfills this need and further provides other related advantages.

DISCLOSURE OF THE INVENTION

The present invention resides in an intrusion detector system with a transmitter and a receiver. The transmitter having: transmitter clock means for generating a transmitter clock at a selected clock frequency; transmitter pseudorandom code generator means responsive to the transmitter clock for generating a predetermined transmitter pseudorandom code sequence signal; source means for generating an electromagnetic signal; modulator means for spread-spectrum modulating the electromagnetic signal in accordance with the transmitter pseudorandom code sequence signal; and transmitter antenna means for transmitting the modulated electromagnetic signal through a desired zone of protection. The receiver having: receiver antenna means for receiving the modulated electromagnetic signal after being transmitted through the zone of protection; demodulator means for detecting and demodulating the modulated electromagnetic signal to recover the transmitter pseudorandom code sequence signal; receiver clock means for generating a receiver clock at the selected clock frequency; receiver pseudorandom code generator means responsive to the receiver clock for generating a receiver pseudorandom code sequence signal corresponding to the transmitter pseudorandom code sequence signal; detector means for comparing the received transmitter pseudorandom code sequence signal to the receiver pseudorandom code sequence signal, and generating a detection signal proportional to the signal amplitude of the received transmitter pseudorandom code sequence signal when the receiver pseudorandom code sequence signal matches the received transmitter pseudorandom code sequence signal; and monitor means for detecting changes in the detection signal resulting from the entry or movement of an intruder in the zone of protection, and for generating a signal in response thereto.

The intrusion detector system further has amplifier means for adjustably amplifying the received transmitter pseudorandom code sequence signal and providing the amplified signal to the detector means; and comparator means for comparing the detection signal to a reference signal and generating an automatic gain control signal proportional to the difference between the detection signal and the reference signal. The automatic gain control signal is fed back to the amplifier means to adjustably control the gain of the amplifier means to adjust the detection signal toward the reference signal. The comparator means is switchable between a fast response mode operable for rapid gain control and a slow response mode operable for slow gain control. The slow response mode being sufficiently slow to prevent the automatic gain control signal from significantly adjusting the gain of the amplifier means responsive to a change in the detection signal relative to the reference voltage resulting from the entry or movement of an intruder in the zone of protection having a predetermined size and speed. The monitor means detects changes in the detection signal exceeding a predetermined amount and in response thereto switches the comparator means between the slow response mode and the fast response mode.

The intrusion detector system further has phase detector means for comparing the phase of the received transmitter pseudorandom code sequence signal to the phase of the receiver pseudorandom code sequence signal, and generating a phase error signal proportional to the phase error between the compared signals; and control means responsive to the phase error signal for bringing the receiver pseudorandom code sequence signal into phase synchronization with the received transmitter pseudorandom code sequence signal. The control means phase synchronizes the compared signals by phase shifting the receiver pseudorandom code sequence signal relative to the received transmitter pseudorandom code sequence signal. The control means shifts the compared signals by varying the clock frequency of the receiver clock means responsive to the phase error signal. The control means also selectively provides for more rapid phase synchronization.

The receiver clock means generates the receiver clock from a higher frequency reference clock, and the control means phase synchronizes the compared signals by selectively adding or removing one or more pulses of the reference clock to phase shift the receiver pseudorandom code sequence signal relative to the received transmitter pseudorandom code sequence signal upon the phase error signal exceeding a predetermined phase error signal.

The transmitter clock means includes oscillator means for generating a transmitter reference clock; frequency divider means for frequency dividing the transmitter reference clock into a plurality of transmitter clocks at different frequencies; and frequency selecting means for selecting one of the plurality of transmitter clocks as an operating transmitter clock, the frequency selecting means being programmable to select a predetermined one of the plurality of transmitter clocks. The receiver clock means includes ocillator means for generating a receiver reference clock; frequency divider means for frequency dividing the receiver reference clock into a plurality of receiver clocks at different frequencies, the frequencies corresponding to the frequencies of the transmitter clocks; and frequency selecting means for selecting one of the plurality of receiver clocks as an operating receiver clock, the frequency selecting means being programmable to select a predetermined one of the plurality of receiver clocks corresponding to the operating transmitter clock.

The transmitter pseudorandom code generator means generates a plurality of transmitter pseudorandom code sequence signals, and further includes code selecting means for selecting one of the plurality of transmitter pseudorandom code sequence signals as an operating transmitter code sequence signal. The code selecting means is programmable to select a predetermined one of the plurality of transmitter pseudorandom code sequence signals. The receiver pseudorandom code generator means generates a plurality of receiver pseudorandom code sequence signals corresponding to the transmitter pseudorandom code sequence signals, and further includes code selecting means for selecting one of the plurality of receiver pseudorandom code sequence signals as an operating receiver code sequence signal. The code selecting means is programmable to select a predetermined one of the plurality of receiver pseudorandom code sequence signals corresponding to the operating transmitter code sequence signal. The transmitter and receiver code sequences have a repetition rate outside the information bandwidth derived from detection of an intruder in the zone of protection.

The intrusion detector further includes audio means for generating an audio signal with a frequency and amplitude variable in response to changes in the detection signal. The audio signal changes in frequency in proportion to changes in the detection signal. The audio signal is changed to a predetermined frequency and increased in amplitude upon the detector signal increasing or decreasing by a predetermined amount corresponding to entry or movement of an intruder in the zone of protection. The audio signal has an amplitude insufficient to produce an audible sound when the detection signal corresponds to a stable amplitude received transmitter code sequence signal.

The intrusion detector has a voltage regulator means for supplying a regulated supply voltage to the source means in the transmitter, with the amplitude of the electromagnetic signal produced by the source means being variably responsive to the supply voltage; and modulator means for selectively modulating the supply voltage to generate a modulated electromagnetic signal received by the receiver simulating a moving intruder in the zone of protection. The voltage regulator includes a power supply supplying power to the source means at a selected voltage level; and the modulator means includes a frequency generator selectively generating a wave train and a modulator controlling the voltage level supplied the source means by the power supply in response to the wave train.

A method of practicing the invention is also disclosed.

Other features and advantages of the invention will become apparent from the following more detailed description taken in conjunction with the accompanying drawings.

BEST MODE FOR CARRYING OUT THE INVENTION

Figure 1:
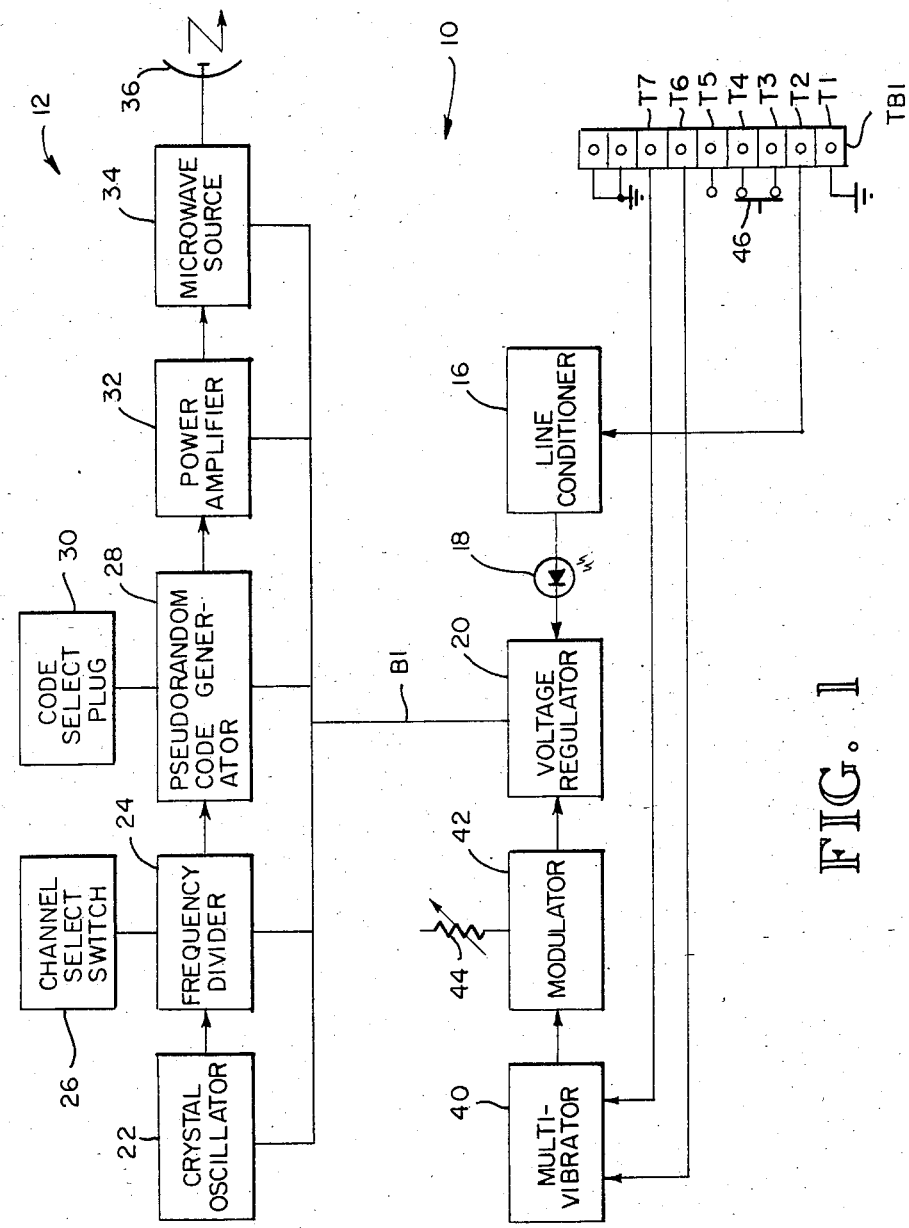
FIG. 1 is a functional block diagram of a transmitter unit of an intrusion detection system embodying the present invention.

As shown in the drawings for purposes of illustration, the present invention is embodied in an intrusion detector 10 using a direct sequence, spread spectrum modulation technique. The intrusion detector 10 is a bistatic microwave motion sensor system having a transmitter unit 12 and a receiver unit 14. The transmitter unit 12 radiates a narrow beam microwave signal through a line-of-sight zone that is to be protected. The microwave signal is modulated by a unique pseudorandom code. The modulation with the code causes a spreading of the transmitted signal over a very wide frequency band, i.e., spread spectrum, rendering ordinary receiving or jamming techniques ineffective. The transmitted signal has a low density power spectrum which facilitates signal hiding and provides an improved jamming counter-measure. A conventional narrow band jamming signal will have its power spectrum spread during demodulation of the pseudorandom code, thus even a high power jamming signal will have little effect on the pseudorandom code upon which the receiver unit 12 operates. Since the received signal is the sum of the direct ray and the signal reflected from the ground, constructive and destructive interference between the direct and reflected signals occurs, and the interference in conventional intrusion detectors can produce null or low signal areas within the zone of protection if antennas are not carefully positioned. The interference, and hence the location of these null areas, is frequency dependent. By use of the spread spectrum signal, the signal includes a wide range of frequencies and any interference which results is not concentrated in any one location within the zone of protection and more thorough zone coverage is achieved. The pseudorandom code used to achieve the spread spectrum signal allows selective addressing of the receiver unit 12 and permits many intrusion detectors to be operated in close proximity without interference between them.

The receiver unit 14 of the intrusion detector 10 receives the microwave spread spectrum and demodulates the signal. The amplitude of the demodulated signal establishes a reference within the receiver unit 14. If there is even a small change in the level of the received spread spectrum signal, such as caused by an intrusion upon the microwave beam, the amplitude of the demodulated signal changes with respect to the established reference. The change is detected by alarm circuitry within the receiver unit 14 and an alarm signal is sent out from the receiver unit. The time constants of the receiver unit 14 are such that slow changes in the level of the received signal, such as caused by rain, snow, growing grass and the like, are ignored by the alarm circuitry.

The integrity of the intrusion detector 10 is protected by the provision of tamper switches in both the transmitter and receiving units 12 and 14. The tamper switches provide an electric indication of the opening of the electronics enclosure of either unit. The intrusion detector 10 is designed to detect and provide an alarm signal under the following conditions:

a. Beam break, resulting from a large decrease in the level of the received signal;

b. Jamming, resulting from the reception of a undesirable signal;

c. Multipath, resulting from a changing microwave pattern, such as caused by an object moving in the protected zone between the transmitter unit and the receiver unit;

d. Tampering, resulting from the opening of the electronics enclosure of either the transmitter or receiver unit;

e. Power loss, resulting from a cutoff of power to either the transmitter or receiver unit; and f. Malfunction, resulting from a component failure or loss of wiring integrity.

In addition to the above, the intrusion detector 10 is provided with a self-test function which allows an electronic simulation of an intrusion of the protected zone. It also has an audio output proportional to the multipath detection signal for either remote aural verification of detection or self test verification.

TRANSMITTER UNIT

With reference to the functional block diagram of FIG. 1 for the transmitter unit 12, a ground is provided on the terminal T1 of a terminal box TB1 and +12 VDC input power is provided to the transmitter unit through the terminal T2 of the terminal box. The +12 VDC is passed through a line conditioner 16, where it is filtered to remove high-frequency AC components. The line conditioner 16 also provides high-voltage transient and reverse-polarity protection. The output of the line conditioner 16 is passed through a light-emitting diode 18 to a voltage regulator 20. The light-emitting diode 18 provides a power-on indication for the transmitter unit 12, while the voltage regulator 20 reduces the conditioned input power to a regulated +5 VDC. The +5 VDC is connected to a bus B1 and provides the power for all of the active circuits within the transmitter unit 12.

A crystal oscillator 22 provides a stable reference frequency for the transmitter unit 12. The reference frequency is divided down to one of eight possible clock frequencies by a programmable frequency divider 24. A channel select switch 26 provides the means for selecting the desired operating clock frequency from the eight possible frequencies. The clock is provided to a pseudorandom code generator 28, which generates a pseudorandom code sequence. A programmable code select plug 30 is used to select one of six possible pseudorandom code sequences. The six possible psuedo random code sequences each have a repetition rate outside the information bandwidth derived from detection of an intruder in the zone of protection.

A power amplifier 32 increases the power of the pseudorandom code sequence signal to a level necessary to modulate a microwave source 34. The microwave source 34 converts the high-level pseudorandom code sequence signal to a high-level, pseudorandom code-regulated microwave signal. The microwave signal is coupled to a transmitting antenna 36. The antenna 36 focuses the microwave signal to a narrow beam and radiates the signal through the zone of protection to a receiving antenna 38 (shown in FIG. 2).

With the application of an appropriate signal to one of the two test inputs of the transmitter unit 12 through the terminal T6 or T7 of the terminal box TB1, a system self-test mode is activated and a multivibrator 40 is caused to produce a low-frequency square wave. The square wave is converted to a triangular wave by a modulator 42. The triangular wave output of the modulator 42 is then applied to the voltage regulator 20 and causes a low-frequency triangular modulation of the +5 VDC-regulated bus B1. This modulation of the bus B1 causes the output of the microwave source 34 to repetitively increase and decrease at a slow rate. The resultant variation of the output power of the microwave source 34 causes variation in the signal strength of the microwave signal that is similar to that caused by a slow moving object in the zone of protection. The amount of signal strength variation is adjustably controlled by a modulation depth control 44. When properly adjusted, activation of the system self-test mode will cause the receiver unit 14 to produce an alarm signal.

An intrusion into the electronics enclosure of the transmitter unit 12 is detected by a tamper switch 46. The tamper switch 46 is mounted under the cover of the electronics enclosure and provides an electrical indication when the cover is opened. The normally closed contact of the tamper switch 46 is connected to the terminal T3 of the terminal box TB1, the common contract is connected to the terminal T4, and the normally open contact is connected to the terminal T5.

RECEIVER UNIT

Figure 2:
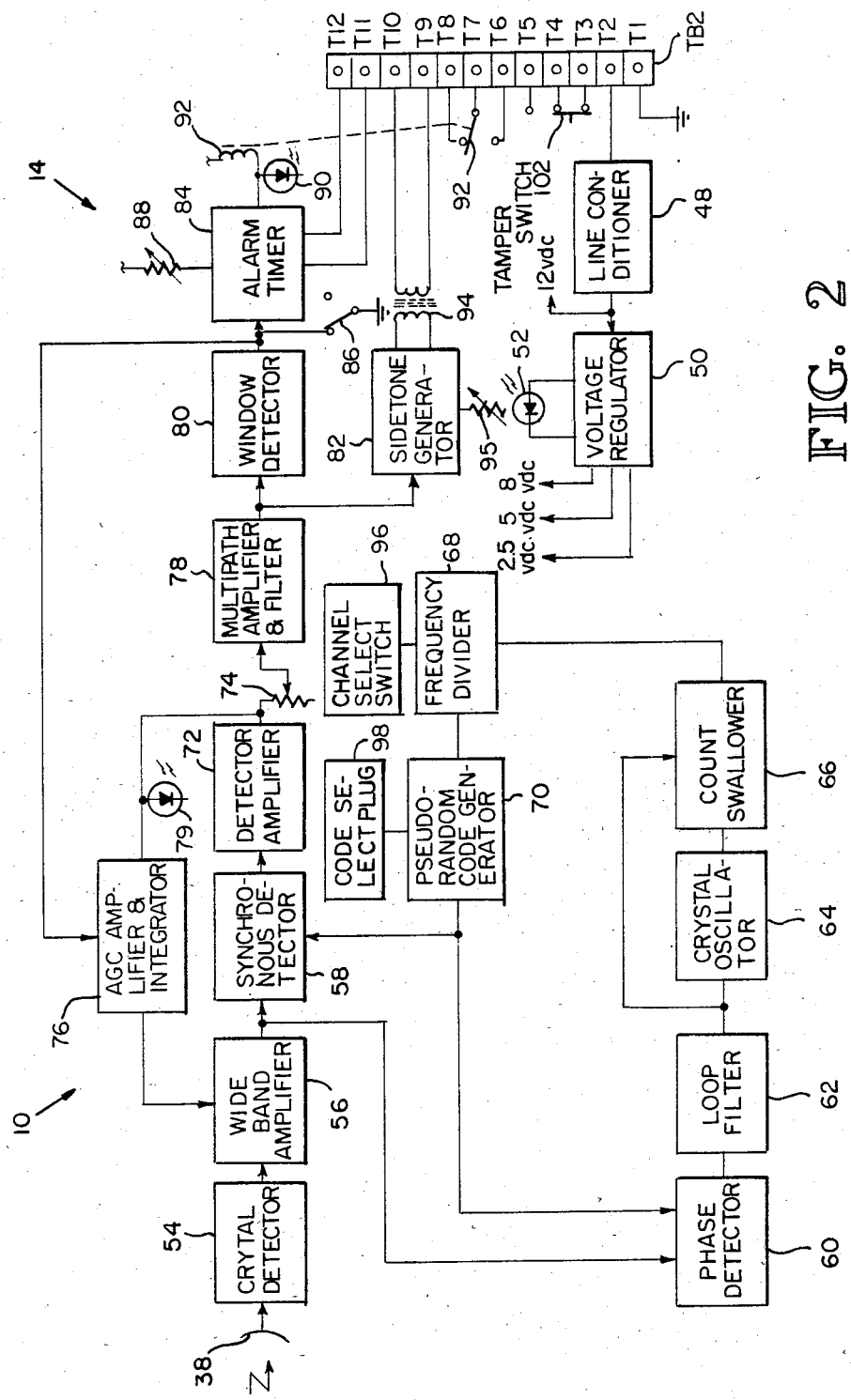
FIG. 2 is a functional block diagram of a receiver unit of the intrusion detector system.

With reference to the functional block diagram of FIG. 2 for the receiver unit 14, ground is provided on the terminal T1 of a terminal box TB2 and a +12 VDC input power is provided to the receiver unit through the terminal T2 of the terminal box. The +12 VDC is passed through a line conditioner 48, where it is filtered to remove high-frequency AC components. The line conditioner 48 also provides high-voltage transient and reverse-polarity protection. The output of the line conditioner 48 is connected to a voltage regulator 50, where the conditioned input power is reduced to three separate regulated voltages of +2.5 VDC, +5 VDC and +8 VDC. The three regulated voltages, along with the conditioned +12 VDC, provide the power for all of the active circuits within the receiver unit 14. A light-emitting diode 52, associated with the voltage regulator 50, provides a power-on indication for the receiver unit 12.

The pseudorandom code-modulated microwave signal, which is radiated through the zone of protection by the transmitting antenna 36, is received by the receiver antenna 38 and detected by a crystal detector 54. The output of the crystal detector 54 is the transmitted spread spectrum, pseudorandom code sequence signal without the microwave component. A wide band amplifier 56 is provided to increase the amplitude of the pseudorandom code sequence signal and applies the signal to one input of a synchronous detector 58 and to one input of a phase detector 60.

The phase detector 60, a loop filter 62, a crystal oscillator 64, a count swallower 66, a frequency divider 68, and a pseudorandom code generator 70 form a phase-locked loop. When the phase-locked loop is properly programmed and in-lock, the output of the pseudorandom code generator 70 will be a pseudorandom code sequence signal that is a synchronous replica of that of the pseudorandom code sequence signal generated by transmitter unit 12. The output of the pseudorandom code generator 70 serves as a local reference for the synchronous detector 58. When the pseudorandom code sequence signal received by the receiver unit 14 and the pseudorandom code sequence signal generated by the pseudorandom code generator 70 are of the same code sequence and synchronized, the output of the synchronous detector 58 will be a DC voltage with an amplitude that is directly proportional to the pseudorandom code sequence signal level at the input to the receiver unit 14. The output DC voltage level of the synchronous detector 58 is amplified by a detector amplifier 72 and applied to an adjustable sensitivity control 74 and to the input of an automatic gain control (AGC) amplifier and integrator 76.

The AGC amplifier and integrator 76 compares the output DC voltage of the detector amplifier 72 with an internal reference voltage and generates an automatic gain control (AGC) voltage that is proportionate to the integral of the difference between the output DC voltage of the detector amplifier and the reference voltage. The AGC voltage is applied to the gain control input of the wide band amplifier 56, where it serves to reduce the gain of the receiver unit 14. Under normal operating conditions, the level of the pseudorandom code sequence signal received by the receiver unit 14 will be excessive and the gain of the wide band amplifier 56 will be reduced by the AGC amplifier and integrator 76 until the output voltage of the detector amplifier 72 is equal to the reference voltage.

The rise time characteristics of the AGC amplifier and integrator 76 are those of a dual response. When the intrusion detector 10 is initially turned on or the receiver unit 14 has been triggered into an alarm condition, electronic switching within the AGC amplifier and integrator 76 will cause the AGC action of the receiver unit to be in a fast response mode. This allows the output DC voltage of the detector amplifier 72 to settle to a value equal to the reference voltage very quickly and prepare the intrusion detector 10 for detection of an intruder.

Once the AGC action of the receiver unit 14 has stabilized, the rise time characteristics of the AGC amplifier and integrator 76 will be switched to a very slow response mode. As a result of the slow response, a change in the level of the received pseudorandom code sequence signal, even one caused by a slow moving intruder in the zone of protection, will result in an error signal being generated by the output DC voltage of the detector amplifier 72 varying significantly from the reference voltage. The error signal is coupled through the sensitivity control 74 to a multipath amplifier and filter 78.

The overall alarm sensitivity of the intrusion detector 10 is controlled by the sensitivity control 74, while a multipath amplifier and filter 78 serves to amplify and limit the bandwidth of the error signal. The output of the multipath amplifier and filter 78 is coupled to the input of a window detector 80 and to the input of a sidetone generator 82. The window detector 80 provides an output signal if the amplified error signal voltage level goes above or below the reference voltage by more than a fixed amount, such as by the received pseudorandom code sequence signal level increasing or decreasing due to the presence of an intruder in the zone of protection or the presence of a significantly large jamming signal.

The output of the window detector 80 is connected to the switch input of the AGC amplifier and integrator 76 and to the trigger input of an alarm timer 84. If a change in the level of the received pseudorandom code sequence signal is large enough to cause the amplified error signal voltage level to exceed either the upper or lower limits of the window detector 80, the resultant output signal of the window detector will cause the AGC amplifier and integrator 76 to be switched to the fast response mode and the alarm timer 84 to be triggered. Once triggered, the alarm timer 84 will generate an output signal for an indefinite period of time when set in a latched mode or for a finite period of time when set in a timed mode. An internally accessible switch 86 is provided for selectively setting the alarm timer 84 to the latched mode or the timed mode. In the timed mode, the period of the output signal of the alarm timer 84 is controlled by a duration control 88. The alarm timer 84 may be reset at any desired time, whether in the latched or timed mode, by the application of an appropriate reset signal to either one of the two reset inputs of the alarm timer through the terminal T11 or T12 of the terminal box TB2.

The output of the alarm timer 84 is connected to an alarm light-emitting diode 90 and to the coil of an alarm relay 92. When the intrusion detector 10 is operating in a standby state, and not under an alarm condition, the alarm relay 92 is energized. When an output signal is generated by the alarm timer 84, the alarm light-emitting diode 90 is illuminated to indicate an alarm condition and the coil of the alarm relay 92 is de-energized. The de-energizing of the relay coil causes the normally closed contacts of the alarm relay 92 to open, while the normally open contacts are caused to close. The normally open contact is connected to the terminal T6, the common movable contact is connected to the terminal T7, and the normally closed contact is connected to the terminal T8. The opening and closing of the contacts of the alarm relay 92 provide an electrical indication of an alarm condition to circuitry external to the receiver unit 14 and connected thereto through the terminal box TB2. The alarm relay 92 also provides a fail-safe feature for the intrusion detector 10 since almost any type of system failure will result in the loss of power to the coil of the alarm relay and cause indication of an alarm condition to the external circuitry connected to the receiver unit 14.

The sidetone generator 82 serves to convert the amplified error signal received from the multipath amplifier and filter 78 to a variable frequency and amplitude audio tone. The audio tone provides an aural means for an operator to monitor the microwave path between the transmitter and receiver units 12 and 14. During the time no error signal exists, the frequency of the audio tone generated by the sidetone generator 82 is 1000 Hz; however, due to the circuit balance and non-linear input components, the amplitude of the audio tone will be substantially zero. When the error signal occurs as a result of an increase in the level of the received pseudorandom code sequence signal, there is a proportionate increase in the frequency of the audio tone and the amplitudes of the audio tone is increased with an exponential response. At the threshold of alarm, due to the increase in received signal level, the audio tone is approximately 1500 Hz and at full amplitude.

When the error signal occurs as a result of a decrease in the level of the received pseudorandom code sequence signal, there is a proportionate decrease in the frequency of the audio tone and the amplitude of the audio tone is increased with an exponential response. At the threshold alarm, due to this decrease in received signal level, the audio tone is approximately 500 Hz and at full amplitude. Should there be an increase or decrease in the received signal level that is sufficient to cause an alarm condition, the audio tone increases to 2000 Hz at full amplitude. The audio tone generated by the sidetone generator 82 is coupled through a transformer 94 to the terminals T9 and T10 of the terminal box TB2 to provide a balanced sidetone output from the receiver unit 14. The frequency of the sidetone output may be calibrated by the selective adjustment of a frequency control 95.

As previously described, the output of the receiver pseudorandom code generator 70 is a pseudorandom code sequence signal that is a synchronous replica of the pseudorandom code sequence signal generated by the transmitter unit 12 when the phase-locked loop is properly programmed and in-lock. The crystal oscillator 64 provides a stable reference frequency for the receiver unit 14 corresponding to the reference frequency of the transmitter unit 12. The receiver reference frequency is divided down to one of eight possible clock frequencies by the frequency divider 68, which is programmable by a channel select switch 96. The channel select switch 96 is used to select a desired operating clock frequency for the receiver unit 14 corresponding to the frequency selected for the transmitter operating clock frequency.

The clock is provided to the pseudorandom code generator 70, which generates the pseudorandom code sequence signal of the receiver unit 14. A programmable code select plug 98 is used to select one of six possible pseudorandom code sequences which corresponds to the code sequence selected for the transmitter unit 12.

While the phase-locked loop is programmed in accordance with the clock frequency and pseudorandom code sequence programming of the transmitter unit 12, an out-of-lock condition will exist during the initial turn-on of the intrusion detector 10, during the reception of large jamming signals and during the loss of a received signal. During such an out-of-lock condition the pseudorandom code sequence signal of the receiver pseudorandom code generator 70 will not be synchronized with the signal of the transmitter unit. The same out-of-lock condition will occur if the receiver unit 14 is operated with the phase-locked loop programmed to the wrong clock frequency or pseudorandom code sequence. The out-of-lock condition produces a large error signal at the output of the detector amplifier 72 and the receiver unit 14 is placed in an alarm condition. The out-of-lock condition is also indicated by illumination of a fault lamp light-emitting diode 79 connected to the output of the detector amplifier 72.

With the use of eight selectable clock frequencies and six selectable code sequences, forty-eight unique combinations are possible and can be used for the intrusion detector 10. Since several intrusion detectors may be programmed to different ones of these forty-eight combinations of clock frequency and code sequence, many intrusion detectors of the present invention may be used within the same vicinity without interfering with each other. The pseudorandom code sequence signal of one intrusion detector will be substantially ignored by the other intrusion detector, providing selective addressing capability, since there will be no matching of the receiver pseudorandom codes on which the other detectors are programmed to operate.

When the intrusion detector 10 is initially turned on and during the recovery of the receiver unit 14 from an out-of-lock condition, the phase-locked loop will operate in a search mode. Once the pseudorandom code sequence signal of the receiver pseudorandom code generator 70 becomes synchronized with the signal of the transmitter unit 12, locking will occur and the phase-locked loop will enter a track mode.

In the search mode, the output of the pseudorandom code generator 70 is compared to the received pseudorandom code sequence signal at the output of the wide band amplifier 56 by the phase detector 60. The output of the phase detector 60 is a phase error voltage that is proportional to the phase error between the received and the receiver-generated pseudorandom code sequence signals. The phase error voltage is passed through the loop filter 62, which serves to filter the error voltage and control the loop response characteristics of the phase-locked loop. The output of the loop filter 62 is connected to a varactor diode within the crystal oscillator 64, which provides a means for varying the resonant frequency of the crystal of the crystal oscillator. As such, the feedback loop of the phase-locked loop is closed; and if a phase error exists between the received and the receiver-generated pseudorandom code sequence signals input to the phase detector 60, the resultant phase error voltage will cause the frequency of the crystal oscillator 64 to change until a near zero phase error is reached. When a near zero phase error voltage is produced by the phase detector 60, phase error has been substantially eliminated and the phase-locked loop is in an in-lock condition and operates in the track mode.

Should, for any reason, the phase error between the received and the receiver-generated pseudorandom code sequences be greater than the equivalent of one code bit, the phase-locked loop will be in an out-of-lock condition since the pseudorandom code sequence signal of the pseudorandom code generator 70 will not be in synchronization with the pseudorandom code sequence signal of the transmitter unit 12. Under this out-of-lock condition, the phase error voltage of the phase detector 60 will be very large; however, the change in frequency of the crystal oscillator 64, which will result through the feedback loop described above, will be relatively small and insufficient to quickly eliminate the phase error. With such a small change in the frequency of the crystal oscillator 64, the pseudorandom code sequence signal of the pseudorandom code generator 70 will slip relative to the pseudorandom code sequence signal received from the transmitter unit 12, but only at a slow rate. An unacceptably long time would be required for the two signals to achieve correlation with each other.

To shorten the time necessary to reach the in-lock condition, the output of the loop filter 62 is also connected to the control input of the count swallower 66. During the out-of-lock condition, a large phase error voltage causes the count swallower 66 to remove pulses from the output of the crystal oscillator 64 and effectively retards the clock supplied to the pseudorandom code generator 70. Since the frequency divider 68 produces the clock by dividing down the reference frequency of the crystal oscillator 64, a number of successive pulses may be removed from the output of the crystal oscillator without shifting the operating clock frequency, or phase of the receiver pseudorandom code sequence signal by a full code bit.

By so retarding the clock, the pseudorandom code sequence signal of the pseudorandom code generator 70 will slip relative to the pseudorandom code sequence signal received from the transmitter unit 12 at a rapid rate and the two signals will quickly achieve correlation. Once the signal correlation is within one code bit, the phase error voltage decreases and the count swallower 66 is disabled. This allows the change in frequency of the crystal oscillator 64 which results from operation of the feedback loop of the phase-locked loop to bring the pseudorandom code sequence signal of the receiver pseudorandom code generator 70 to a near zero phase error with respect to the pseudorandom code sequence signal received from the transmitter unit 12, and thus produce an in-lock condition.

In addition to the alarm-producing detection capabilities of the receiver unit 14, an intrusion into the electronics enclosure of the receiver unit will be detected by a tamper switch 102. The tamper switch 102 is mounted under the cover of the electronics enclosure and provides an electrical indication when the cover is opened. The normally closed contact of the tamper switch 102 is connected to the terminal T3 of the terminal box TB2, the common contact is connected to the terminal T4, and the normally open contact is connected to the terminal T5.

Circuit Description of Transmitter Unit

Figure 3:
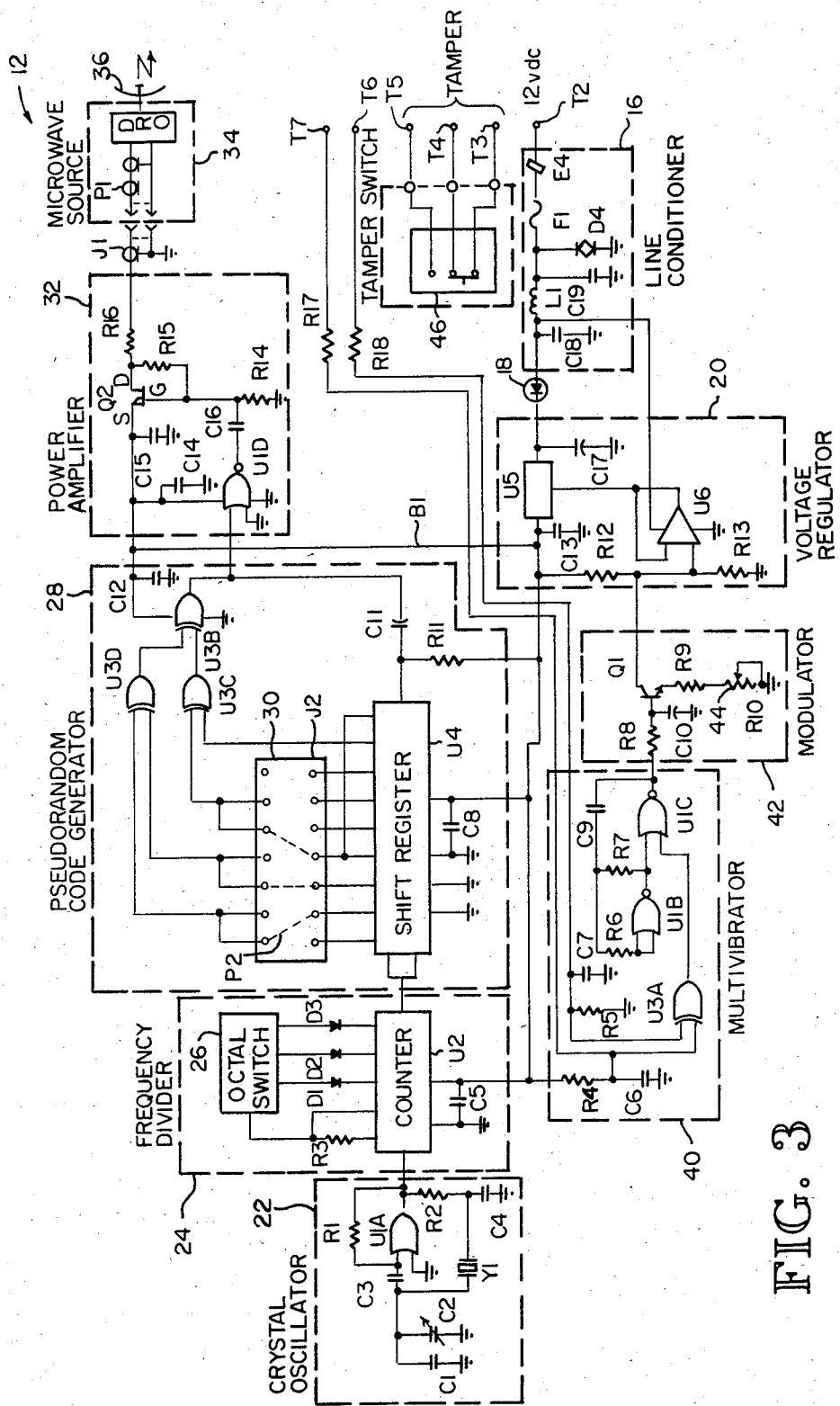
FIG. 3 is an electrical schematic drawing of the transmitter unit of FIG. 1.

For a more specific description of the transmitter unit 12 of the intrusion detector 10, reference is made to the detailed schematic drawing of FIG. 3.

Tamper Switch

If the cover of the electronics enclosure of the transmitter unit 12 is opened during normal operation, the tamper switch 46 will cause the electrical connection between terminals T3 and T4 of the terminal box TB1 to become an open circuit, while a closed circuit connection will be formed between the terminals T4 and T5 of the terminal box. The tamper switch 46 may be wired in series with the +12 VDC input power for the transmitter unit 12 or to external alarm circuitry.

Line Conditioner

The +12 VDC input power provided at the terminal T2 of the terminal box TB1 to the line conditioner 16 is passed through a ferrite bead E4 and a fuse F1 to a Pi section filter comprising the inductor L1 and the capacitors C18 and C19. The filter, along with the ferrite bead E4, serves to remove high-frequency AC components from the +12 VDC line. A transient suppressor D4 is connected between the +12 VDC line and ground to clamp any high-voltage spikes on the line to less than +18 VDC. The transient suppressor D4 also serves to protect the system from polarity reversal of the input power. A normal input voltage to the transmitter unit 12 may vary between 10 to 14 VDC. The output of the filter of the line conditioner 16 is connected to the anode of the light-emitting diode 18. The light-emitting diode 18 provides a power-on indicator as the total drain current of the transmitter unit 12 is passed through the diode. The cathode of the light-emitting diode 18 is connected to the input of the voltage regulator 20.

Voltage Regulator

The voltage regulator 20 comprises an adjustable positive voltage regulator U5, an operational amplifier U6, capacitors C13 and C17, and resistors R12 and R13. The output of the adjustable voltage regulator U5 is connected to the bus B1 and to ground through an in-series voltage divider including the resistors R12 and R13. The junction of the resistors R12 and R13 is connected to the positive input of the operational amplifier U6. The output of the operational amplifier U6 is connected to the adjustment input of the adjustable voltage regulator U5. The adjustable voltage regulator U5 serves as a series pass element of the voltage regulator 20, while the operational amplifier U6 serves as a low-current buffer for the divided output of the adjustable voltage regulator. When the voltage drop across the resistor R12 equals a 1.25 VDC internal voltage reference of the adjustable voltage regulator U5, the output of the voltage regulator 20 provides a regulated +5.0 VDC.

Conventional designs require low resistance values for the resistors R12 and R13 to provide sufficient current so that the drain of drive current provided to the adjustment input of the adjustable voltage regulator U5 will have an insignificant effect on the precision of the voltage division of the resistors R12 and R13, and hence the control of the adjustable voltage regulator U5. It is desirable with the presently dislcosed embodiment of the invention to minimize power consumption for operation of the intrusion detector 10 on solar cells (not shown). use of the operational amplifier U6 as a low-current buffer allows high resistance values to be selected for the voltage divider resistors R12 and R13 with resultant low current draw, while the operational amplifier provides low current drain with sufficient current drive to the adjustment input of the adjustable voltage regulator U5.

The regulated +5.0 VDC output of the adjustable voltage regulator U5 is the power source for all of the active circuits within the transmitter unit 12. Although not shown within the dashed lines indicating the voltage regulator 20, despiking capacitors C5, C8, C12, C14, and C15 are connected to the +5.0 VDC bus B1 throughout the transmitter unit 12 to bypass switching transients.

Crystal Oscillator

The crystal oscillator 22 is a CMOS version of a Pierce crystal oscillator and comprises a NOR gate U1A, capacitors C1, C2, C3 and C4, resistors R1 and R2, and a 3.579545 mHz crystal Y1. The NOR gate U1A is biased into the linear region by the feedback resistor R1 while the resistor R2 and the capacitor C4 serve to shift the phase of the output of the NOR gate U1A. The crystal Y1 feeds the phase shifted energy from junction of R2 and C4 back to the input of the NOR gate U1A through the DC blocking capacitor C3. The crystal oscillator 22 oscillates at the fundamental frequency of the crystal Y1. The output frequency of the crystal oscillator 22 is calibrated at approximately 3.579545 mHz by the adjustment of the adjustable capacitor C2. The output signal of the crystal oscillator 22 is a 5-volt peak-to-peak square wave which serves as the input signal for the frequency divider 24.

Frequency Divider

The frequency divider 24 comprises an octal channel select switch 26, a counter U2, diodes D1, D2 and D3, and resistor R3. The output signal of the crystal oscillator 22 is connected to the clock input of the counter U2.

The count length of the counter U2 is programmable by means of the channel select switch 26 and the feedback provided by the diodes D1, D2 and D3, and the resistor R3. The 3.579545 mHz signal which appears at the input of the frequency divider 24 causes the counter U2 to count up until the count length which has been established by the channel select switch 26 is reached. When the count is completed, the counter U2 is reset to zero by the feedback and again repeats the count-up and reset sequence. The count sequence causes the 3.579545 mHz signal to be divided by a number that is equal to the count length, and as described above, the count length is programmable and preset by the channel select switch 26. At the end of each count sequence, a 5-volt peak-to-peak pulse appears at the output of the frequency divider 24. The frequency divider 24 provides the clock for the pseudorandom code generator 28.

The operating clock frequencies for the clock generated by the frequency divider 24 with respect to the position of the channel select switch 26 are as follows:

| Position of Channel Select Switch | Divide By | Frequency |
| --- | --- | --- |
| 0 | 16 | 223722 Hz |
| 1 | 17 | 210561 Hz |
| 2 | 18 | 198864 Hz |
| 3 | 19 | 188397 Hz |
| 4 | 20 | 178977 Hz |
| 5 | 21 | 170455 Hz |
| 6 | 22 | 162707 Hz |
| 7 | 23 | 155632 Hz |

Pseudorandom Code Generator

The pseudorandom code generator 28 is a pseudorandom sequence counter comprising a shift register U4, exclusive OR gates U3B, U3C and U3D, a resistor R11, and a capacitor C11. The selected clock provided by the frequency divider 24 is connected to the clock inputs of the shift register U4. The shift register U4 has eight stages, with the Q output of selected stages connected to the inputs of the exclusive OR gates U3C and U3D. The outputs of the exclusive OR gates U3C and U3D are connected to the inputs of the exclusive OR gate U3B. The exclusive OR gates U3B, U3C and U3D serve to "modulo-2" add the pulses which appear on the Q outputs of the selected stages of the shift register U4 and produce a binary sum bit which is provided to the data input of the shift register U4 through the capacitor C11.

The Q outputs of the first seven stages of the eight stages of the shift register U4 and the inputs to the exclusive OR gates U3C and U3D are connected to a code select jack J2, and the programmable code select plug 30 mates with the jack and is hardwire programmed to make the desired interconnections between the seven stages and the exclusive OR gates. The Q output of the eighth stage is connected directly to one input of the exclusive OR gate U3C. to generate a maximal length pseudorandom code sequence with the eight-stage shift register U4 using four Q outputs for feedback to the data input of the shift register, six possible pseudorandom code sequences are possible. Each of the six sequences corresponds to using for feedback the Q outputs for one of the following combinations of stages indicated:

[8,4,3,2]
[8,5,3,1]
[8,6,5,1]
[8,6,5,2]
[8,6,5,3]
[8,7,6,1].

Each time a clock pulse appears at the clock input of the shift register U4 of the pseudorandom code generator 28, the data within the shift register is shifted to the right by one stage. The shifting may or may not cause a change of state at the output of the exclusive OR gate U3B, depending on the change of states at the Q outputs of the shift register connected to the inputs of the exclusive OR gates U3B, U3C and U3D. The resultant signal at the output of the exclusive OR gate U3B is a 5-volt peak-to-peak pseudorandom code sequence signal with a bandwidth in excess of 300 kHz. The signal is connected to and drives the power amplifier 32.

Power Amplifier

The power amplifier 32 serves to boost the power of the pseudorandom code sequence signal and consists of a NOR gate U1, a p-channel VMOS power transistor Q2, a capacitor C16, and resistors R14, R15, and R16.

The pseudorandom code sequence signal output of the exclusive OR gate U3B is connected to the input of the NOR gate U1D, and the NOR gate serves as an inverting buffer. The gate of the power transistor Q2 is connected to ground through the resistor R14, and the output signal of the NOR gate U1D is connected through a capacitor C16 to the gate of the power transistor Q2. The source of the power transistor Q2 is connected to +5 VDC. The output signal of the NOR gate U1D is a 5-volt peak-to-peak inverted version of the pseudorandom code sequence signal. The power transistor Q2 is biased as an overdriven class "A" amplifier and inverts the signal applied to its gate to produce at its drain a high-current, 5-volt peak-to-peak replica of the pseudorandom code sequence signal which appears at the input of the power amplifier 32.

The resistor R15 is connected between the drain and the gate of the power transistor Q2. The resistor R16 is connected between the drain of the power transistor Q2 and an output jack J1. The jack J1 may be connected through a coaxial cable to an input plug P1 of the microwave source 34. The resistor R16 reduces the output signal of the power transistor Q2 to approximately 3.5 volts, peak to peak, and serves as a means of limiting the output power of the transmitter unit 12.

Microwave Source

The microwave source 34 is a GaAs field-effect transistor oscillator, with its frequency of operation determined by the resonant characteristics of a ceramic dielectric material. Such an oscillator is commonly referred to as a dielectric resonator oscillator or DRO. The DRO is switched on and off at a pseudorandom rate by the pseudorandom code sequence signal at the output of the power amplifier 32 to generate a spread spectrum microwave signal having a low-density power spectra and a frequency spectrum of approximately (sin x/x)$^2$ centered at the microwave frequency. The output power of the DRO is approximately −1 dBm (avg.) at 10.525 gHz. The output is coupled to the transmitting antenna 36, where it is focused and radiated in the form of a narrow, direct sequence, pseudorandom, modulated microwave beam through the zone of protection.

Multivibrator

The multivibrator 40 is a low-frequency, CMOS, astable oscillator comprising NOR gates U1B and U1C, resistors R6 and R7, and a capacitor C9. When in the self-test mode, the multivibrator 40 is activated by the gating circuit comprising an exclusive OR gate U3A, resistors R4, R5, R17 and R18, and capacitors C6 and C7. The terminal T6 of the terminal box TB1 is connected through the resistor R18 to one input of the exclusive OR gate U3A, and the terminal T7 is connected through the resistor R17 to the other input of the exclusive OR gate U3A. The application of a positive voltage of +5 to +15 VDC to the terminal T6 or of a ground to the terminal T7 will cause the output of the exclusive OR gate U3A to go to a low state and allow the astable oscillator (NOR gates U1B and U1C) of the multivibrator 40 to oscillate. The output of the multivibrator 40 is a 5-volt peak-to-peak square wave at 0.36 Hz. The square wave serves to drive the input of the modulator 42.

Modulator

The modulator 42 is an integrating, voltage-to-current converter comprising an NPN transistor Q1, resistors R8, R9 and R10, and a capacitor C10. The modulator 42 is active only when the transmitter unit 12 is in the self-test mode, during which the multivibrator 40 is activated.

The output of the multivibrator 40 is connected to the base of the transistor Q1 through the resistor R8, and the capacitor C10 is connected between the base of the transistor and ground. The modulator 42 converts the square wave output of the multivibrator 40 to a triangular waveform by the R/C network of the resistor R8 and the capacitor C10. The waveform is converted from a voltage waveform to a triangular current, sinking waveform at the output of the modulator 40 by the transistor Q1 and the resistors R9 and R10.

The emitter of the transistor Q1 is connected to ground through the in-series combination of the resistors R9 and R10. The resistor R10 is a variable resistor and comprises the modulation depth control 44. The collector of the transistor Q1 is connected to the junction of the resistors R12 and R13 of the voltage regulator 20 and applies the triangular waveform output of the modulator 42 to the junction to produce a triangular voltage modulation of this junction. The voltage at the output of the modulator 42 is +3.75 VDC, plus or minus the modulation voltage.

The result of the modulation at the junction of the resistors R12 and R13 is a triangular variation in the +5 VDC output of the voltage regulator 20 on the bus B1. The variation of bus B1 causes a variation of the output power of the microwave source 34, thus simulating a disturbance of the microwave beam received by the receiver unit 14. The variation in the output power has a period of 2.8 seconds and the level of variation may be adjusted from +0.25 dB to +3.0 dB by the adjustment of the modulation depth control 44 (resistor R10).

Circuit Description of Receiver Unit

Figure 4A:
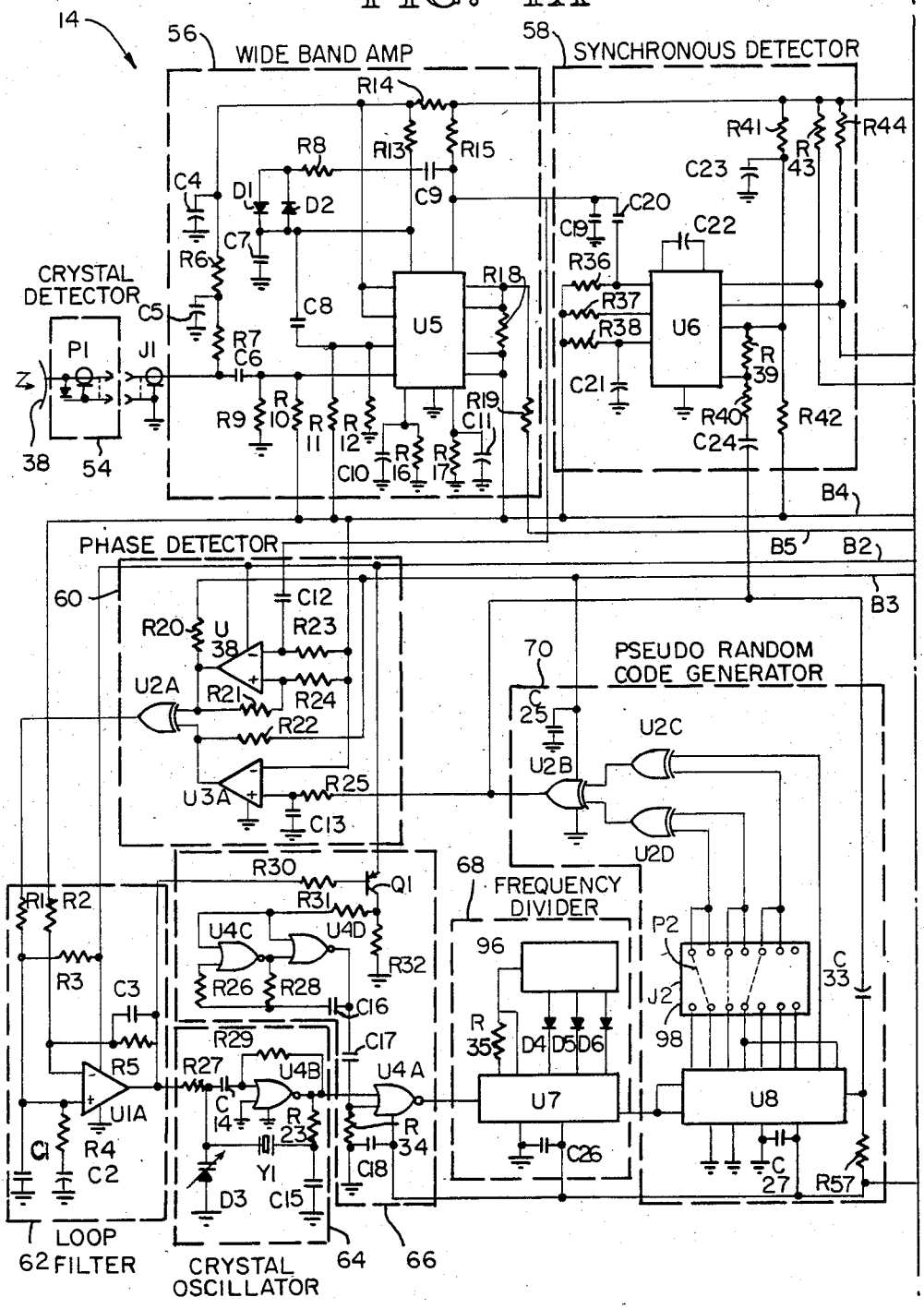
FIGS. 4A and 4B comprise an electrical schematic drawing of the receiver unit of FIG. 2.
Figure 4B:
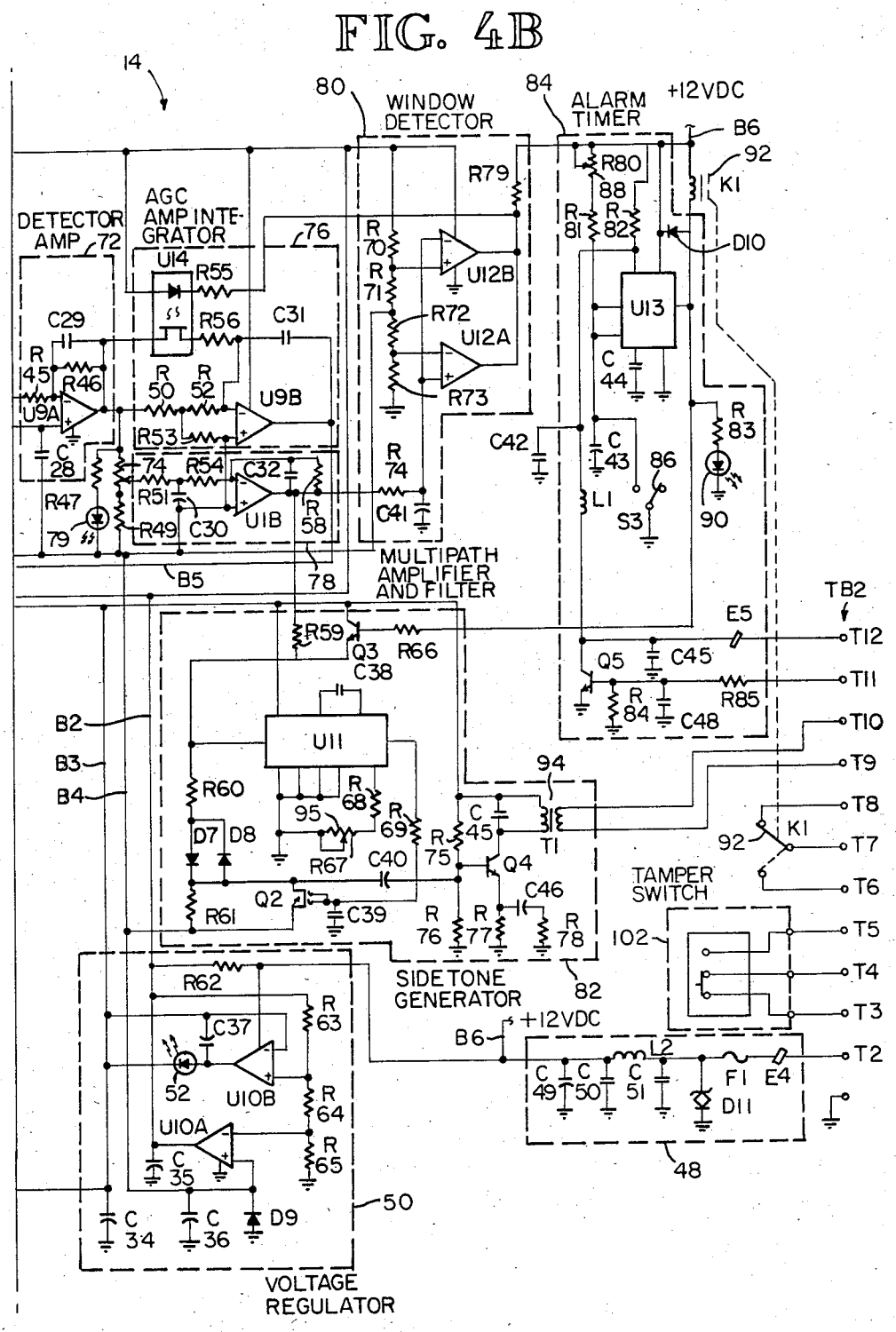

For a more specific description of the receiver unit 14 of the intrusion detector 10, reference is made to the detailed schematic drawing of FIGS. 4A and 4B.

Tamper Switch

If the cover of the electronics enclosure is opened during normal operation, the tamper switch 102 will cause the electrical connection between the terminals T3 and T4 of the terminal box TB1 to become an open circuit, while a closed circuit connection will be formed between the terminals T4 and T5 of the terminal box. The tamper switch 102 may be wired in series with the +12 VDC input power for the receiver unit 14 or to external alarm circuitry.

Line Conditioner

The +12 VDC input provided at the terminal T2 of the terminal box TB2 to the line conditioner 48 is passed through a ferrite bead E4 and a fuse F1 to a Pi section filter comprising an inductor L2 and capacitors C49, C50 and C51. The filter, along with the ferrite bead E4, serves to remove high-frequency AC components from a +12 VDC bus line B6. A transient suppressor D11 is connected between the +12 VDC line and ground to clamp any high-voltage spikes on the line to less than +18 VDC. The transient suppressor D11 also serves to protect the system from polarity reversal of the input power. A normal input voltage to the receiver unit 14 may vary between 10 to 14 VDC. The output of the filter of the line conditioner 48 is connected to the voltage regulator 50 and provides unregulated power for the alarm timer 84 and relay 92.

Voltage Regulator

The voltage regulator 50 is an operational amplifier-type regulator circuit comprising dual operational amplifiers U10A and U10B, a +2.5 VDC active Zener diode D9, resistors R62, R63, R64 and R65, capacitors C34, C35, C36 and C37, and a light-emitting diode 52. The output of the line conditioner 48 is connected throught the resistor R62 to a +8.0 VDC bus B2. The in-series voltage divider comprising the resistors R63, R64 and R65 is connected between the +8.0 VDC bus B2 and ground. The positive input of the operational amplifier U10B is connected to the junction of the resistors R63 and R64, and the negative input is connected to a +5.0 VDC bus B3. The negative input of the operational amplifier U10A is connected to the junction of the resistors R64 and R65, and the positive input is connected to the cathode of the Zener diode D9. The anode of the Zener diode D9 is connected to ground.

The voltage drop across the Zener diode D9 establishes a +2.5 VDC reference for the voltage regulator 50 and is connected to a +2.5 VDC reference bus B4. The majority of the Zener current for the Zener diode D9 is supplied by the resistors R41 and R42, connected in series between the +8.0 VDC bus B2 and the +2.5 VDC reference bus B4. The resistors R41 and R42 are shown in FIG. 4A within the dashed lines indicating the synchronous detector 58. The +2.5 VDC reference serves as the main reference voltage for the analog circuitry within the receiver unit 14.

The resistors R63, R64 and R65 form a feedback network around the operational amplifier U10A. When the voltage at the junction of the resistors R64 and R65 equals the +2.5 VDC on the positive input of the operational amplifier U10A, the output of operational amplifier will be a regulated +8.0 VDC. The output of the operational amplifier U10A is connected to the bus B2 and the +8.0 VDC serves as the main power source for the analog circuitry within the receiver unit 14.

The feedback network comprising the resistors R63, R64 and R65 also provides a +5.0 VDC at the junction of the resistors R63 and R64 which is applied to the positive input of the operational amplifier U10B. The output of the operational amplifier U10B is connected to the anode of the light-emitting diode 52 and the cathode of the diode is connected to the +5.0 VDC bus B3. The output of the operational amplifier U10B is connected through the light emitting diode 52 and the bus B3 back to the negative input of the amplifier, thus causing the voltage at the cathode of the light-emitting diode 52 to equal the same +5.0 VDC that appears at the positive input of the operational amplifier U10B. The +5.0 VDC which appears at the cathode of the light-emitting diode 52 supplies the power to the +5.0 VDC bus B3 for the digital circuits within the receiver unit 14. Since all of the current flow from the output of the operational amplifier U10B to the +5.0 VDC bus B3 flows through the light-emitting diode 52, the diode serves as a power-on indicator.

The capacitors C34, C35, C36 and C37 serve to improve the transient response characteristics of the voltage regulator 50. Although not shown within the dashed lines indicating the voltage regulator 50, despiking capacitors C18, C25, C26 and C27 are connected to the +5.0 VDC bus B3 throughout the receiver unit 14 to bypass switching transients.

Crystal Detector

The crystal detector 54 (see FIG. 4A) is a two-electrode semiconductor diode whose rectifying properties serve to detect the amplitude variations of the microwave signal which is received by the receiving antenna 38. The detection sensitivity of the diode is improved by the application of a forward bias current by the resistors R6 and R7, which are shown within the dashed lines indicating the wide band amplifier 56. The output of the crystal detector 56 is a low-level signal that is a replica of the pseudorandom code sequence signal which amplitude modulates the microwave source 34 in the transmitter unit 12 by switching it on and off. The low-level signal is connected to input of the wide band amplifier 56 through a plug P1 and a jack J1.

Wide Band Amplifier

The wide band amplifier 56 is a two-stage, cascode/-differential, resistance-capacitance coupled, variable gain, high-frequency amplifier. The wide band amplifier 56 comprises a dual cascode/differential amplifier U5, diodes D1 and D2, resistors R8, R9, R10, R11, R12, R13, R14, R15, R16, R17, R18 and R19, and capacitors C6, C7, C8, C9, C10 and C11. The low-level output signal of the crystal detector 54 is coupled to the input of the first stage of the cascode/differential amplifier U5 through the capacitor C6. The first stage serves to increase the signal level by +30 dB. The output of the first stage is coupled to the input of the second stage of the cascode/differential amplifier U5 through the capacitor C8, and the signal level is again increased by +30 dB. The combined gain of the first and second stages provides an overall gain between input and output of the cascode/differential amplifier U5 of +60 dB. The output of the wide band amplifier 56 is a replica of the pseudorandom code sequence signal generated by the transmitter unit 12.

An AGC bus B5 connected to the AGC amplifier and integrator 76 provides the AGC voltage to the gain control input of the cascode/differential amplifier through the resistor R19. The presence of a positive voltage on the AGC bus B5 causes a reduction of the overall gain of the wide band amplifier 56 and the dynamic range of this gain reduction is greater than 100 dB. When the voltage on the AGC bus B5 is at its positive limit, the overall gain of the wide band amplifier 56 will be less than −40 dB. During the period of time that is required for the receiver to develop an AGC voltage, the feedback network consisting of the diodes D1 and D2, the capacitor C9, and the resistor R8 is connected between the output of the second stage and the output of the first stage, to prevent saturation of the cascode/-differential amplifier U5 by a high-level signal at the input of the receiver unit 14.

The capacitors C10 and C11 control the low-frequency response characteristics of the cascode/differential amplifier U5, while the capacitors C7 and C19 control the high-frequency roll-off characteristics of the amplifier. The capacitor C19 is shown within the dashed lines indicating the synchronous detector 58. The output of the wide band amplifier 56 is connected to the signal inputs of the synchronous detector 58 and to the phase detector 60.

Synchronous Detector

The synchronous detector 58 is a balanced circuit comprising a balanced demodulator U6, resistors R36, R37, R38, R39, R40, R41, R42, R43 and R44, and capacitors C20, C21, C22, C23 and C24. The output signal of the wide band amplifier 56 is connected to the signal input of the demodulator U6 through the capacitor C20, while the output of the pseudorandom code generator 70 is connected to the carrier input of the demodulator U6 through the in-series combination of the capacitor C24 and the resistor R40.

When the outputs of the wide band amplifier 56 and the pseudorandom code generator 70 are of the same code sequence and in-phase, a differential DC output voltage will be produced by the synchronous detector 58 that is directly proportional to the amplitude of the input signal to the receiver unit 14. The circuit has a conversion gain of +30 dB; therefore, the differential DC output voltage of the synchronous detector 58 will be +30 dB greater than the peak-to-peak output of the wide band amplifier 56. The differential output of the synchronous detector 58 is connected to the differential input of the detector amplifier 72 (see FIG. 4B). The low-frequency response characteristics of the synchronous detector 58 are controlled by the capacitor C22 connected between the gain adjust pins of the demodulator U6, while the high-frequency roll-off characteristics are controlled by the response of the detector amplifier 72.

Detector Amplifier

The detector amplifier 72 (see FIG. 4B) is a fixed gain, differential DC amplifier circuit comprising an operational amplifier U9A, resistors R45 and R46, and capacitors C28 and C29. The detector amplifier 72 converts the differential output of the synchronous detector 58 to an amplified single-ended output. The DC gain of the operational amplifier U9A is set at +10 dB by the resistors R45 and R46, while the high-frequency roll-off characteristics are controlled by the capacitors C28 and C29. The combined gains of the wide band amplifier 56, synchronous detector 58, and detector amplifier 72 provide an overall receiver unit gain at the output of the detector amplifier of +100 dB without the presence of an AGC voltage.

In order to provide the receiver unit 14 with a delayed signal detection and AGC action, a DC offset voltage at the differential input of the operational amplifier U9A is produced by the unequal values of the output load resistors R43 and R44 of the synchronous detector 58. The offset causes the output of the operational amplifier U9A to remain at a high positive voltage until the level of the signal received by the receiver unit 14 is large enough to overcome the offset. Once the offset is overcome, the output voltage of the operational amplifier U9A will move in a negative direction and the magnitude of the change will be proportional to the change in amplitude of the received signal.

The output of the operational amplifier U9A is connected to the input of the AGC amplifier and integrator 76, to the sensitivity control potentiometer 74, and to the anode of the fault lamp light-emitting diode 79 through the resistor R47. The cathode of the fault lamp light-emitting diode 79, and the sensitivity control potentiometer 74 through the resistor R49, are connected to the +2.5 VDC reference bus B4. Whenever the output voltage of the operational amplifier U9A is substantially positive with respect to the +2.5 VDC reference bus B4, the fault lamp light-emitting diode 79 will be illuminated. The sensitivity control potentiometer 74 serves to reduce the alarm detection sensitivity of the receiver unit 14, and the resistor R49 prevents the sensitivity from being reduced to zero. The wiper of the sensitivity control potentiometer 74 is connected to the input of the multipath amplifier and filter 78.

AGC Amplifier and Integrator

The AGC amplifier and integrator 76 is a long-term operational amplifier integrator comprising an operational amplifier U9B, resistors R50, R52, R53, R55 and R56, a capacitor C31, and a light-emitting diode/photo field-effect transistor optical isolator U14. The output of the detector amplifier 72 is connected to the negative input of the operational amplifier U9B through the in-series combination of the resistors R50 and R52, while the positive input is connected to the +2.5 VDC reference bus B4. The capacitor C31 is connected between the output and the negative input of the operational amplifier U9B, causing the operational amplifier to function as an integrator.

The resistor R53 is connected between the junction of the resistors R50 and R52 and the +2.5 VDC reference bus B4 and causes the effective resistance of R52 to appear very high. This very high effective input resistance to the integrator operational amplifier U9B causes the rise time characteristics of the AGC amplifier and integrator 76 to be extremely slow. The output of the operational amplifier U9B is connected to the AGC bus B5. As previously described, the AGC bus B5 is connected to the gain control input of the wide band amplifier 56.

When there is little or no signal present at the input to the receiver unit 14, the output of the detector amplifier 72 will be positive with respect to the +2.5 VDC reference, and the output of the operational amplifier U9B will saturate at low positive voltage with respect to ground. This low voltage will appear on the AGC bus B5 and the wide band amplifier 56 will be operating at full gain. When a signal appears at the input of the receiver unit 14 that is large enough to cause the output of the detector amplifier 72 to drop to a value that is negative with respect to the +2.5 VDC reference, the voltage at the output of the operational amplifier U9B increases in a positive direction and the gain of the wide band amplifier 56 will be reduced until the output of the detector amplifier is equal to the +2.5 VDC reference voltage.

For extremely slow changes in the amplitude of the received signal, the closed loop AGC action will attempt to maintain the output voltage of the detector amplifier 72 at a value that is equal to the +2.5 VDC reference voltage. If the change in the amplitude of the received signal is faster than the rise time of the AGC amplifier and integrator 76, an error voltage will appear between the output of the detector amplifier 72 and the +2.5 VDC reference bus B4. The multipath amplifier and filter 78 and the sidetone generator 82 respond to the error signal.

The initial stabilization of the AGC action of the receiver unit 14 would normally require a very long period of time due to the extremely slow rise time characteristics of the output of the AGC amplifier and integrator 76. This is overcome, however, by the fast settle circuit comprising the optical isolator U14 and the resistors R55 and R56. During the initial turn-on of the intrusion detector 10 or upon an alarm condition, a large error signal will appear at the output of the detector amplifier 72. The error signal is applied to the input of the windown detector 80 through the sensitivity control potentiometer 74 and multipath amplifier and filter 78.

The output of the window detector is connected through the resistor R55 to the cathode of the light-emitting diode forming a part of the optical isolator U14. The anode of the diode is connected to the +8.0 VDC bus B2. The resistor R56 is connected between the negative input of the operational amplifier UB9 and one terminal of the field-effect transistor of the optical isolator U14. The other terminal of the field-effect transistor is connected to the output of the operational amplifier U9A of the detector amplifier 72, effectively placing the resistor R56 in parallel with the in-series combination of the resistors R50 and R52 when the field-effect transistor is conducting. As a result of a large error signal, the output of the window detector 80 will go low and sink current from the light-emitting diode of the optical isolator U14. This causes the photo field-effect transistor of the optical isolator U14 to switch on and connect the resistor R56 across the resistors R50 and R52. Since the resistance of the resistor R56 is selected much lower than that of either the resistor R50 or R52, the switching on of the optical isolator U14 reduces the effective input resistance to the integrator operational amplifier U9B. The low input resistance to the integrator operational amplifier U9B causes the rise time characteristics of the AGC amplifier and integrator 76 to become fast and the AGC action of the receiver unit 14 will settle very quickly.

Once the AGC action of the receiver unit 14 is stable and the error signal output from detector amplifier 72 is less than that required to cause an alarm condition, the output of the window detector 80 will go high, the optical isolator U14 will switch off, and the rise time characteristics of the AGC amplifier and integrator 76 will return to those of a very slow response.

Multipath Amplifier and Filter

The multipath amplifier and filter 78 is an inverting amplifier and two-pole, active filter circuit comprising an operational amplifie U1B, resistors R51, R54, and R58, and capacitors C30 and C32. The multipath amplifier and filter 78 amplifies and limits the bandwidth of the error signal from the output of the detector amplifier 72. The level of the error signal is selectively controlled by adjustment of the sensitivity control potentiometer 74. The wiper of the sensitivity control potentiometer 74 is connected to the negative input of the operational amplifier U1B through the resistors R51 and R54, and the positive input is connected to the +2.5 VDC reference bus B4. The DC gain of the operational amplifier U1B is set at +17 dB and by the feedback resistor R58, while the upper frequency response is limited by the capacitors C30 and C32. The capacitor C30 connected between the junction of the resistors R51 and R54, and the +2.5 VDC reference bus B4, and the capacitor C32 is connected in parallel with the resistor R58. The output of the operational amplifier U1B is connected to the input of the window detector 80 and to the input of the sidetone generator 82.

Window Detector

The window detector 80 is a dual comparator, circuit comprising dual comparators U12A and U12B, resistors R70, R71, R72, R73, R74 and R79, and a capacitor C41. The window detector 80 serves to produce an output signal when the output of the multipath amplifier and filter 78 goes above or below the +2.5 VDC reference voltage by a predetermined amount. The output of the operational amplifier U1B of the multipath amplifier and filter 78 is connected through the resistor R74 to the positive input of the comparator U12A and to the negative input of the comparator U12B. The positive input of the comparator U12A and the negative input of the comparator U12B are connected together and to ground through the capacitor C41. The combination of the resistor R74 and the capacitor C41 serves as an additional filter to limit the upper frequency response of the output of the multipath amplifier and filter 78.

The resistors R70, R71, R72 and R73 form a voltage divider connected between the +8.0 VDC bus B2 and ground. The junction of the resistors R70 and R71 is connected to the positive input of the comparator U12B and provides an upper threshold voltage to the positive input of the comparator. The junction of the resistors R72 and R73 is connected to the negative input of the comparator U12A and provides a lower threshold voltage to the negative input of the comparator. The two threshold voltages vary from the +2.5 VDC reference voltage by an equal amount, one being set above and one below the +2.5 VDC reference voltage. When there is a change in the level of the signal at the input of the receiver unit 14 that is large enough to cause the output of the multipath amplifier and filter 78 to exceed either of the upper or lower threshold voltages, an alarm condition will exist and the output of the window detector 80 will switch to a low state. the output of the window detector 80 is connected to the switch input of the AGC amplifier and integrator 76 and to the trigger input of the alarm timer 84.

Alarm Timer

The alarm timer 84 is a monostable timer circuit comprising a CMOS timer U13, an NPN transistor Q5, a diode D10, the light-emitting diode 90, the switch 86, an inductor L1, resistors R80, R81, R82, R83, R84 and R85, and capacitors C42, C43, C44, C47, and C48. The coil of the alarm relay 92 is connected between the +12 VDC bus B6 and the output of the alarm timer 84. The output of the timer U13 is connected through the resistor R83 to the anode of the "alarm" light-emitting diode 90 and the cathode is connected to ground. Under a non-alarm condition, the output of the alarm timer 84 will be at a low state and the coil of the alarm relay 92 will be energized. With the coil of the alarm relay 92 energized, the electrical connection between the terminals T7 and T8 of the terminal box TB1 will be closed and the electrical connection between terminals T7 and T6 will be open.

When an alarm condition causes the output of the window detector 80 to switch to a low state, the alarm timer 84 will be triggered and the output of the alarm timer will switch to a high state. The high state causes the coil of the alarm relay 92 to become de-energized and the electrical connection between terminals T7 and T8 of the terminal box TB1 to become an open circuit, while the electrical connection between terminal T7 and T6 will become a closed circuit. The high state at the output of the alarm timer 84 will also cause the "alarm" light-emitting diode 90 to light.

With the switch 86 in the timed position, the high state will remain at the output of the alarm timer until the charge potential of the capacitor C43 reaches a threshold of approximately 66% of the potential on the +12 VDC bus B6. The period of time required to reach this threshold may be controlled by the adjustment of the duration control 88. Once the threshold is reached, the internal circuitry of the timer U13 will discharge the capacitor C43 to ground and the output of the alarm timer will return to a low state. If the switch 86 is in the latch position when the alarm timer is triggered, the capacitor C43 will not be allowed to charge and the output of the alarm timer will remain at a high state until the alarm timer is reset by an external signal or the system is turned off. The alarm timer 84 may be reset at any time, whether the switch 86 is in the latch or timed positions, by the connection of the terminal T12 to ground or the application of +5 to +15 VDC to the terminal T11.

Sidetone Generator

The sidetone generator 82 is a voltage-controlled oscillator and modulator circuit comprising a voltage-controlled oscillator U11, a dual-gate, MOS field-effect transistor Q2, an NPN transistor Q3, an NPN transistor Q4, diodes D7 and D8, the transformer 94, resistors R59, R60, R61, R66, R67, R68, R69, R75, R76, R77, and R78, and capacitors C38, C39, C40, C45, and C46. The output of the sidetone generator 82 is a variable frequency, variable amplitude, balanced 600 ohm audio audio signal. Changes in the amplitude and frequency of the audio signal are indicative of deviations in the amplitude of the signal at the receiver unit 14 input. The signal from the output of the multipath amplifier and filter 78 is applied to the input of the voltage-controlled oscillator U11 through the resistor R59. When the amplitude of the signal at the input of the receiver unit 14 is stable, the output of the multipath amplifier and filter 78 will be approximately equal to the +2.5 VDC reference and the output of the voltage-controlled oscillator U11 will be a square wave at a frequency of approximately 1000 Hz. This frequency may be adjusted by the frequency control 95 comprising the resistor R67.

An increase or decrease in the amplitude of the signal at the receiver unit 14 input will, respectively, cause the output of the multipath amplifier and filter 78 to go positive or negative with respect to the +2.5 VDC reference bus B4. When the output of the multipath amplifier and filter 78 goes positive with respect to the +2.5 VDC reference bus B4, the output frequency of the voltage-controlled oscillator U11 will increase. When the output of the multipath amplifier and filter 78 goes negative with respect to the +2.5 VDC reference bus B4, the output frequency of the voltage-controlled oscillator U11 will decrease.

The output of the voltage-controlled oscillator U11 is connected to both gates of the dual-gate MOS field-effect transistor Q2 through the resistor R69, and the square wave output of the voltage-controlled oscillator U11 serves to switch the transistor Q2 on and off with a 50% duty cycle. The capacitor C39 limits the rise time of the square wave to prevent spikes from being injected into the drain of the transistor Q2. The signal that appears at the input of the voltage-controlled oscillator U11 is also conveyed to the drain of the transistor Q2 through a non-linear attenuator network comprising the resistors R60 and R61, and the diodes D7 and D8. As the output voltage of the multipath amplifier and filter 78 varies with respect to the +2.5 VDC reference bus B4, the voltage that is available at the drain of the transistor Q2 will vary in an exponential fashion due to the non-linear characteristics of the diodes D7 and D8. The switching action of the transistor Q2 causes the voltage that is available at the drain of the transistor Q2 to be chopped at a frequency that is equal to the output of the voltage-controlled oscillator U11. When the output of the multipath amplifier and filter is equal to the +2.5 VDC reference bus, there will be no signal at the drain of Q2.

When the output of the multipath amplifier and filter 78 goes positive with respect to the +2.5 VDC reference bus B4 as the result of an increase in the amplitude of the signal at the receiver input, the frequency of the signal at the drain of the transistor Q2 will increase in proportion to the increase in the amplitude of the received signal and the amplitude of the signal at the drain of the transistor Q2 will increase exponentially with respect to the increase in the amplitude of the received signal. At the positive threshold of alarm, the frequency will be 1500 Hz and the amplitude will be at a maximum. When the output of the multipath amplifier and filter 78 goes negative with respect to the +2.5 VDC reference bus B4 as the result of a decrease in the amplitude of the signal at the receiver unit 14 input, the frequency of the signal at the drain of the transistor Q2 will decrease in proportion to the decrease in the amplitude of the received signal and the amplitude of the signal at the drain of the transistor Q2 will increase exponentially with respect to the change in the amplitude of the received signal. At the negative threshold of alarm, the frequency will be 500 Hz and the amplitude will be at a maximum.

If a change in the amplitude of the signal at the receiver input is large enough to cause an alarm, the high state that appears at the output of the alarm timer 84 will be coupled to the base of the transistor Q3 through the resistor R66. This will cause the transistor Q3 to saturate and pull the input to the voltage-controlled oscillator U11 up to the level of the +5.0 VDC bus B3. As a result, the frequency of the signal at the drain of the transistor Q2 increases to 2000 Hz and the amplitude of the signal will be +3 dB above the pre-alarm maximum. The drain of the transistor Q2 is coupled to the base of the transistor Q4 through the capacitor C40. The configuration of the transistor Q4 and the resistors R75, R76, R77, and R78, the capacitors C45 and C46 and the transformer 94 is that of a class A audio amplifier with a voltage gain of +30 dB. This amplifier serves to amplify the signal which appears at the drain of the transistor Q2 and provides a balanced 600 ohm output to the terminals T9 and T10. The output of the sidetone generator will be a maximum of 0 dBm under the non-alarm condition and a maximum of +3 dBm under the alarm condition.

Crystal Oscillator

The crystal oscillator 64, like that of the transmitter, is a CMOS version of a Pierce crystal oscillator and comprises a NOR gate U4B, a varactor diode D3, resistors R27, R29, and R33, capacitors C14 and C15, and a 3.579545 mHz crystal Y1. The NOR gate U4B is biased into the linear region by the feedback resistor R29, while the resistor R33 and the capacitor C15 serve to shift the phase of the output of the NOR gate U4B. The crystal Y1 feeds the phase-shited energy from the junction of the resistor R33 and the capacitor C15 back to the input of the NOR gate U4B through the DC blocking capacitor C14 and the crystal oscillator 64 oscillates at the fundamental frequency of the crystal Y1. The output frequency of the crystal oscillator 64 is maintained at approximately 3.579545 mHz by the application of the appropriate error voltage to the cathode of the diode D3 through the isolation resistor R27. The error voltage is supplied by the output of the loop filter 62. The output of the crystal oscillator is a 5-volt peak-to-peak square wave and serves as the input signal for the count swallower 66.

Count Swallower

The count swallower 66 is an astable multivibrator and signal gating circuit comprising NOR gates U4A, U4C and U4D, a PNP transistor Q1, resistors R26, R28, R30, R31, R32, and R34, and capacitors C16 and C17. When the receiver is stable under normal operating conditions, the phase-locked loop of the receiver unit 14 will be in-lock and the signal from the output of the crystal oscillator 64 is inverted by the NOR gate U4A and passed on to the input of the frequency divider 68.

When the phase-locked loop of the receiver unit 14 is out-of-lock, current will not be sinked from the base of the transistor Q1 by the output of the loop filter via 62 through resistor R30. This causes the collector of transistor Q1 to go low and activate the multivibrator, which is comprised of the NOR gates U4C and U4D, resistors R26 and R28, and capacitor C16. The output of the multivibrator is a square wave at approximately 1000 Hz. The square wave output of the multivibrator is differentiated by the capacitor C17 and R34 to form a 1.0 microsecond pulse at their junction. The pulse is applied to one of the inputs of the NOR gate U4A, which in turn causes the output of U4A to go to a high state for 1.0 microsecond, and prevents the output of the crystal oscillator 64 from being passed on to the input of the frequency divider 68 for 1.0 microsecond. A single cycle from the output of the multivibrator has the effect of removing 3.58 cycles from the output of the crystal oscillator 64. As the output of the multivibrator cycles at 1000 Hz, the total effect on the output of the crystal oscillator 64 is a frequency reduction of approximately 3580 Hz. Therefore, the output of the count swallower 66 will appear to be 3.575965 mHz when the phase-locked loop is out-of-lock and 3.579545 mHz when the loop is in-lock.

Frequency Divider

The frequency divider 68 is identical to that of the transmitter unit 12 and comprises a channel select switch 96, a counter U7, diodes D4, D5, and D6, and a resistor R35. The count length of the counter U7 is programmable by means of the channel select switch 96 and the feedback components provided by the diodes D4, D5, and D6 and the resistor R3. The 3.579545 mHz signal which appears at the input of the frequency divider 68 causes the counter U2 to count up until the count length which has been established by the channel select switch 96 is reached. At this point, the counter U7 is reset to zero by feedback provided by the feedback components and repeats the count-up and reset sequence. The sequence causes the 3.579645 mHz signal to be divided by a number that is equal to the count length that has been preset by the channel select switch 96. At the end of each count sequence, a 5-volt peak-to-peak pulse appears at the output of the frequency divider 68. The frequency divider 68 output serves as the clock for the pseudorandom code generator 70. Under normal operation, the channel select switch 96 is set to the same channel as that of the transmitter unit 12. The operating clock frequencies for the clock, generated by the frequency divider 68 with respect to the position of the channel select switch 96, are identical to those of the transmitter unit 12 described above.

Pseudorandom Code Generator

The pseudorandom code generator 70 is a pseudorandom-sequence counter circuit which is identical to that of the transmitter unit 12. This circuit comprises a shift register U8, exclusive OR gates U2B, U2C, and U2D, a resistor R57 and a capacitor C33. The shift register U8 is an eight-stage shift register with Q outputs connected to the inputs of the exclusive OR gates U2C and U2D through a code select jack J2 and a plug P2.

The exclusive OR gates U2B, U2C, and U2D serve to "modulo-2" add the data which appears at their inputs and produce a binary sum bit which is conveyed to the data input of the shift register U8 through the capacitor C33. Each time a pulse appears at the input of the pseudorandom code generator 70, the data within the shift register U8 is shifted to the right one stage. This action may or may not cause a change of state at the output of the OR gate U2B, depending on the change of states at the Q outputs of the shift register U8. The resultant signal at the output of the OR gate U2B is a 5-volt peak-to-peak pseudorandom sequence which is identical to that of the transmitter unit 12. This signal is connected to one of the inputs of the phase detector 60 and to the carrier input of the synchronous detector 58. The code select plug P2 provides a means whereby the pseudorandom code generator may be programmed for one of six possible maximal length code sequences in the manner described above for the transmitter unit 12. Under normal operating conditions, the code plug P2 will be programmed the same as that of the transmitter.

Phase Detector

The phase detector 60 is a dual-comparator, exclusive OR gate phase comparator circuit comprising the dual comparators U3A and U3B, an exclusive OR gate U2A, resistors R20, R21, R22, R23, R24 and R25, and capacitors C12 and C13. This circuit serves to compare the output of the wide band amplifier 56 with the output of the pseudorandom code generator 70 and produces an output signal that is indicative of the phase difference between the two signals.

The low-level pseudorandom code sequence signal which appears at the output of the wide band amplifier 56 is conveyed to the negative input of the comparator U3B through the capacitor C12. The output from the comparator U3B is a high-level replica of the pseudorandom code sequence signal of the transmitter unit 12. This output is applied to one of the inputs of the exclusive OR gate U2A. The feedback resistor from the output to the positive input of the comparator U3B serves to provide the comparator U3B with hysteresis to eliminate noise from the pseudorandom code sequence signal. The output of the pseudorandom code generator 70 is conveyed to the positive input of the comparator U3A through the resistor R25. The capacitor C13 serves to shift the phase of the pseudorandom code sequence from the output of the pseudorandom code generator 70. The output of the comparator U3A is applied to the remaining input of the exclusive OR gate U2A and is a phase-shifted replica of the output of the pseudorandom code generator 70. When the output of the pseudorandom code generator 70 is in phase and of the same pseudorandom code sequence as that of the transmitter unit 12, the output of the phase detector 60 will be a signal whose average DC value is indicative of the phase difference between the pseudorandom code sequence signal of the transmitter unit 12 and the pseudorandom code sequence signal of the receiver unit 14. The output of the phase detector 60 is applied to the input of the loop filter 62.

Loop Filter

The loop filter 62 is an active filter circuit comprising an operational amplifier U1A, resistors R1, R2, R3, R4, and R5, and capacitors C1, C2 and C3. This circuit serves to filter and amplify the output signal from the phase detector 60 while controlling the dynamic characteristics of the phase-locked loop of the receiver unit 14. The output of the phase detector 60 is conveyed to the positive input of the operational amplifier U1A through the resistor R1. The capacitors C1 and C3 serve to filter the signal from the output of the phase detector 60, while the resistor R4 and the capacitor C2 serve to control the loop response of the phase-locked loop. The feedback resistor R5 from the output to the negative input of the operational amplifier U1A serves to set the DC gain of the loop filter 62 at +27 dB. The output of the loop filter 62 will be a DC error signal.

The error signal is conveyed to the cathode of the varactor D3 within the crystal oscillator 64 through the resistor R27. When the pseudorandom code sequence of the receiver unit 14 is not in phase with the pseudorandom code sequence of that of the transmitter unit 12, the error signal from the output of the loop filter 62 will cause the frequency of the crystal oscillator 64 to shift by a small amount unitl the two pseudorandom code sequences are in phase. If the phase difference is greater than one code bit, the phase-locked loop will drop out of lock and the pull-up resistor R3 will cause the output of the loop filter 62 to go to a high state. This high state will cause the count swallower 66 to be activated, and the apparent input frequency to the frequency divider 68 will be reduced by 3580 Hz. This reduction in frequency will cause the pseudorandom code sequence of the receiver unit 14 to slip by the pseudorandom code sequence of that of the transmitter unit 12 at a rapid rate and the two pseudorandom code sequences will reach a point of correlation very quickly. Once the code correlation is within one code bit, the error voltage from the output of the loop filter 62 will drop from a high state, the count swalloer 66 will be disabled, and the phase-locked loop will take over and bring the pseudorandom code sequence output of the receiver pseudorandom code generator to a near zero phase difference with that of the pseudorandom code sequence of the transmitter unit 12, thus causing the phase-locked loop of the receiver unit 14 to lock.

If the receiver unit 14 receives an undesired jamming signal of an amplitude greater than the amplitude of the desired received signal, the input signal dynamic range of the receiver unit 14 phase-locked loop is such that the phase-locked loop will be forced to drop out-of-lock and the receiver unit 14 will be caused to produce an alarm signal.

In the presently preferred embodiment of the invention, conventional components are employed throughout, and the following components, identified by part number and manufacturer, may be used. It will be understood that the invention is not limited to the use of the specific components set forth herein:

| Component | Manufacturer Part No. | Manufacturer |
|---|---|---|
| TRANSMITTER UNIT | | |
| U2 | 74HC4024 | National Semiconductor |
| U4 | MC14015B | Motorola |
| U5 | LM317 | National Semiconductor |
| U6 | LF441CN | National Semiconductor |
| D4 | 1.5KE18 | Motorola |
| Q2 | VP0300L | Siliconix |
| RECEIVER UNIT | | |
| U5 | CA3054 | RCA |
| U6 | MC1496 | Motorola |
| U7 | 74HC4024 | National Semiconductor |
| U8 | MC14015B | Motorola |
| U11 | MC14046 | Motorola |
| U13 | ICM7555 | Intersil |
| U14 | H11F1 | GE |
| D11 | 1.5KE18 | Motorola |
| Q2 | 40841 | RCA |

It will be appreciated that, although specific embodiments of the invention have been described herein for purposes of illustration, various modifications may be made without departing from the spirit and scope of the invention. Accordingly, the invention is not limited except as by the appended claims.

We claim:

1. An intrusion detector system comprising a transmitter and a receiver, said transmitter having:

transmitter clock means for generating a transmitter clock at a selected clock frequency;

transmitter pseudorandom code generator means responsive to said transmitter clock for generating a predetermined transmitter pseudorandom code sequence signal;

source means for generating an electromagnetic signal;

modulator means for spread-spectrum modulating said electromagnetic signal in accordance with said transmitter pseudorandom code sequence signal; and transmitter antenna means for transmitting said modulated electromagnetic signal through a desired zone of protection;

and said receiver having:

receiver antenna means for receiving said modulated electromagnetic signal after being transmitted through said zone of protection;

demodulator means for detecting and demodulating said modulated electromagnetic signal to recover said transmitter pseudorandom code sequence signal;

receiver clock means for generating a receiver clock at said selected clock frequency;

receiver pseudorandom code generator means responsive to said receiver clock for generating a receiver pseudorandom code sequence signal corresponding to said transmitter pseudorandom code sequence signal;

detector means for comparing said received transmitter pseudorandom code sequence signal to said receiver pseudorandom code sequence signal, and generating a detection signal proportional to the signal amplitude of said received transmitter pseudorandom code sequence signal when said receiver pseudorandom code sequence signal matches said received transmitter pseudorandom code sequence signal; and monitor means for detecting changes in said detection signal resulting from the entry or movement of an intruder in said zone of protection, and for generating a signal in response thereto.

2. The intrusion detector system of claim 1, further including:

amplifier means for adjustably amplifying said received transmitter pseudorandom code sequence signal and providing said amplified signal to said detector means; and comparator means for comparing said detection signal to a reference signal and generating an automatic gain control signal proportional to the difference between said detection signal and said reference signal, said automatic gain control signal being fed back to said amplifier means to adjustably control the gain of said amplifier means to adjust said detection signal toward said reference signal.

3. The intrusion detector system of claim 2 wherein said comparator means is switchable between a fast response mode operable for rapid gain control and a slow response mode operable for slow gain control, said slow response mode being sufficiently slow to prevent said automatic gain control signal from significantly adjusting the gain of said amplifier means responsive to a change in said detection signal relative to said reference voltage resulting from the entry or movement of an intruder in said zone of protection having a predetermined size and speed; and wherein said monitor means detects changes in said detection signal exceeding a predetermined amount and in response thereto switches said comparator means between said slow response mode and said fast response mode.

4. The intrusion detector system of claim 1, further including:

phase detector means for comparing the phase of said received transmitter pseudorandom code sequence signal to the phase of said receiver pseudorandom code sequence signal, and generating a phase error signal proportional to the phase error between said compared signals; and control means responsive to said phase error signal for bringing said receiver pseudorandom code sequence signal into phase synchronization with said received transmitter pseudorandom code sequence signal.

5. The intrusion detector system of claim 4 wherein said control means phase synchronizes said compared signals by phase shifting said receiver pseudorandom code sequence signal relative to said received transmitter pseudorandom code sequence signal.

6. The intrusion detector system of claim 5 wherein said control means shifts said compared signals by varying the clock frequency of said receiver clock means responsive to said phase error signal.

7. The intrusion detector system of claim 4 wherein said receiver clock means generates said receiver clock from a higher frequency reference clock, and said control means phase synchronizes said compared signals by adding or removing one or more pulses of said reference clock to phase shift said receiver pseudorandom code sequence signal relative to said received transmitter pseudorandom code sequence signal upon said phase error signal exceeding a predetermined phase error signal.

8. The intrusion detector system of claim 1 wherein said transmitter clock means includes:

oscillator means for generating a transmitter reference clock;

frequency divider means for frequency dividing said transmitter reference clock into a plurality of transmitter clocks at different frequencies; and frequency selecting means for selecting one of said plurality of transmitter clocks as an operating transmitter clock, said frequency selecting means being programmable to select a predetermined one of said plurality of transmitter clocks; and wherein said receiver clock means includes:

oscillator means for generating a receiver reference clock;

frequency divider means for frequency dividing said receiver reference clock into a plurality of receiver clocks at different frequencies, said frequencies corresponding to the frequencies of said transmitter clocks; and frequency selecting means for selecting one of said plurality of receiver clocks as an operating receiver clock, said frequency selecting means being programmable to select a predetermined one of said plurality of receiver clocks corresponding to said operating transmitter clock.

9. The intrusion detector system of claim 1 wherein said transmitter pseudorandom code generator means generates a plurality of transmitter pseudorandom code sequence signals, and further includes:

code selecting means for selecting one of said plurality of transmitter pseudorandom code sequence signals as an operating transmitter code sequence signal, said code selecting means being programmable to select a predetermined one of said plurality of transmitter pseudorandom code sequence signals; and wherein said receiver pseudorandom code generator means generates a plurality of receiver pseudorandom code sequence signals corresponding to said transmitter pseudorandom code sequence signals, and further includes:

code selecting means for selecting one of said plurality of receiver pseudorandom code sequence signals as an operating receiver code sequence signal, said code selecting means being programmable to select a predetermined one of said plurality of receiver pseudorandom code sequence signals corresponding to said operating transmitter code sequence signal.

10. The intrusion detector system of claim 1, further including audio means for generating an audio signal with a frequency and amplitude variable in response to changes in said detection signal.

11. The intrusion detector system of claim 10 wherein said audio signal increases in frequency in proportion to one of said detection signal's increasing or decreasing, and decreases in frequency in proportion to the other of said detection signal's increasing or decreasing.

12. The intrusion detector system of claim 11 wherein said audio signal is changed to a predetermined frequency and increased in amplitude upon said detector signal's increasing or decreasing by a predetermined amount corresponding to entry or movement of an intruder in said zone of protection.

13. The intrusion detector system of claim 10 wherein said audio signal changes in frequency and amplitude in proportion to changes in said detection signal.

14. The intrusion detector system of claim 10 wherein said audio signal has an amplitude insufficient to produce an audible sound when said detection signal corresponds to a stable amplitude received transmitter code sequence signal.

15. The intrusion detector of claim 1, further including means for synchronizing said receiver pseudorandom code sequence signal with said received transmitter pseudorandom code sequence signal.

16. The intrusion detector system of claim 1, further including:

voltage regulator means for supplying a supply voltage to said source means, the amplitude of said electromagnetic signal produced by said source means being variably responsive to said supply voltage; and modulator means for selectively modulating said supply voltage to generate a modulated electromagnetic signal received by said receiver simulating a moving intruder in said zone of protection, whereby self-test of the operation of the system can be made.

17. The intrusion detector system of claim 16 wherein said voltage regulator means includes:

a power supply supplying power to said source means at a selected voltage level, and wherein said modulator means includes:

a frequency generator selectively generating a wave train; and a modulator controlling the voltage level supplied said source means by said power supply in response to said wave train.

18. An intrusion detector system comprising a transmitter and a receiver, said transmitter having:

a transmitter clock means for generating a transmitter clock at a selected clock frequency;

a transmitter pseudorandom code generator responsive to said transmitter clock generating a predetermined transmitter pseudorandom code sequence signal;

a power source generating an electromagnetic signal;

a modulator spread-spectrum modulating said electromagnetic signal in accordance with said transmitter pseudorandom code sequence signal; and a transmitter antenna transmitting said modulated electromagnetic signal through a desired zone of protection;

and said receiver having:

a receiver antenna receiving said modulated electromagnetic signal after being transmitted through said zone of protection;

a demodulator detecting and demodulating said modulated electromagnetic signal to recover said transmitter pseudorandom code sequence signal;

a receiver means for clock generating a receiver clock at said selected clock frequency;

a receiver pseudorandom code generator responsive to said receiver clock generating a receiver pseudorandom code sequence signal corresponding to said transmitter pseudorandom code sequence signal;

a detector comparing said received transmitter pseudorandom code sequence signal to said receiver pseudorandom code sequence signal, and generating a detection signal proportional to the signal amplitude of said received transmitter pseudorandom code sequence signal when said receiver pseudorandom code sequence signal matches said received transmitter pseudorandom code sequence signal;

a monitor detecting changes in said detection signal resulting from the entry or movement of an intruder in said zone of protection, and generating a signal in response thereto.

19. The intrusion detector system of claim 18, further including:

an amplifier adjustably amplifying said received transmitter pseudorandom code sequence signal and providing said amplified signal to said detector; and a comparator comparing said detection signal to a reference signal and generating an automatic gain control signal proportional to the difference between said detection signal and said reference signal, said automatic gain control signal being fed back to said amplifier to adjustably control the gain of said amplifier to adjust said detection signal toward said reference signal.

20. The intrusion detector system of claim 19 wherein said comparator is switchable between a fast response mode operable for rapid gain control and a slow response mode operable for slow gain control, said slow response mode being sufficiently slow to prevent said automatic gain control signal from significantly adjusting the gain of said amplifier responsive to a change in said detection signal relative to said reference voltage resulting from the entry or movement of an intruder in said zone of protection having a predetermined size and speed; and wherein said monitor detects changes in said detection signal exceeding a predetermined amount and in response thereto switches said comparator between said slow response mode and said fast response mode.

21. The intrusion detector system of claim 18, further including:

a phase detector comparing the phase of said received transmitter pseudorandom code sequence signal to the phase of said receiver pseudorandom code sequence signal, and generating a phase error signal proportional to the phase error between said compared signals; and a phase control responsive to said phase error signal bringing said receiver pseudorandom code sequence signal into phase synchronization with said received transmitter pseudorandom code sequence signal.

22. The intrusion detector system of claim 21 wherein said phase control synchronizes said compared signals by phase shifting said receiver psuedorandom code sequence signal relative to said received transmitter pseudorandom code sequence signal.

23. The intrusion detector system of claim 22 wherein said phase control shifts said compared signals by varying the clock frequency of said receiver clock responsive to said phase error signal.

24. The intrusion detector system of claim 21 wherein said receiver clock means generates said receiver clock from a higher frequency reference clock, and said phase control synchronizes said compared signals by adding or removing one or more pulses of said reference clock to phase shift said receiver pseudorandom code sequence signal relative to said received transmitter pseudorandom code sequence signal upon said phase error signal's exceeding a predetermined phase error signal.

25. The intrusion detector system of claim 18 wherein said transmitter clock means includes:

an oscillator generating a transmitter reference clock;

a frequency divider frequency dividing said transmitter reference clock into a plurality of transmitter clocks at different frequencies;

a frequency selector selecting one of said plurality of transmitter clocks as an operating transmitter clock, said frequency selector being programmable to select a predetermined one of said plurality of transmitter clocks; and wherein said receiver clock means includes:

an ocillator generating a receiver reference clock;

a frequency divider frequency dividing said receiver reference clock into a plurality of receiver clocks at different frequencies, said frequencies corresponding to the frequencies of said transmitter clocks;

a frequency selector selecting one of said plurality of receiver clocks as an operating receiver clock, said frequency selector being programmable to select a predetermined one of said plurality of receiver clocks corresponding to said operating operating transmitter clock.

26. The intrusion detector system of claim 18 wherein said transmitter pseudorandom code generator generates a plurality of transmitter pseudorandom code sequence signals, and further includes:
a code selector selecting one of said plurality of transmitter pseudorandom code sequence signals as an operating transmitter code sequence signal, said code selector being programmable to select a predetermined one of said plurality of transmitter pseudorandom code sequence signals; and
wherein said receiver pseudorandom code generator generates a plurality of receiver pseudorandom code sequence signals corresponding to said transmitter pseudorandom code sequence signals, and further includes:
a code selector selecting one of said plurality of receiver pseudorandom code sequence signals as an operating receiver code sequence signal, said code selecting means being programmable to select a predetermined one of said plurality of receiver pseudorandom code sequence signals corresponding to said operating transmitter code sequence signal.

27. The intrusion detector system of claim 18, further including an audio generator generating an audio signal with a frequency and amplitude variable in response to changes in said detection signal.

28. The intrusion detector system of claim 27 wherein said audio signal increases in frequency in proportion to one of said detection signal's increasing or decreasing, and decreases in frequency in proportion to the other of said detection signal's increasing or decreasing.

29. The intrusion detector system of claim 28 wherein said audio signal is changed to a predetermined frequency and increased in amplitude upon said detector signal's increasing or decreasing by a predetermined amount corresponding to entry or movement of an intruder in said zone of protection.

30. An intrusion detector systsem comprising a transmitter and a receiver, said transmitter having:
transmitter clock means for generating a transmitter clock at a selected clock frequency;
transmitter pseudorandom code generator means responsive to said transmitter clock for generating a predetermined transmitter pseudorandom code sequence signal;
source means for generating an electromagnetic signal;
modulator means for spread-spectrum modulating said electromagnetic signal in accordance with said transmitter pseudorandom code sequence signal; and
transmitter antenna means for transmitting said modulated electromagnetic signal through a desired zone of protection;
and said receiver having:
receiver antenna means for receiving said modulated electromagnetic signal after being transmitted through said zone of protection;
demodulator means for detecting and demodulating said modulated electromagnetic signal to recover said transmitter pseudorandom code sequence signal;
amplifier means for adjustably amplifying said received transmitter pseudorandom code sequence signal;
receiver clock means for generating a receiver clock at said selected clock frequency;
reciver pseudorandom code generator means responsive to said receiver clock for generating a receiver pseudorandom code sequence signal corresponding to said transmitter pseudorandom code sequence signal;
detector means for comparing said amplified received transmitter pseudorandom code sequence signal from said amplifier means to said receiver pseudorandom code sequence signal, and generating a detection signal proportional to the signal amplitude of said received transmitter pseudorandom code sequence signal when said receiver pseudorandom code sequence signal matches said received transmitter pseudorandom code sequence signal;
comparator means for comparing said detection signal to a reference signal and generating an automatic gain control signal proportional to the difference between said detection signal and said reference signal, said automatic gain control signal being fed back to said amplifier means to adjustably control the gain of said amplifier means to adjust said detection signal toward said reference signal, said comparator means being switchable between a fast respones mode operable for rapid gain control and a slow response mode operable for slow gain control, said slow response mode being sufficiently slow to prevent said automatic gain control signal from significantly adjusting the gain of said amplifier means responsive to a change in said detection signal relative to said reference voltage resulting from the entry or movement of an intruder in said zone of protection having a predetermined size and speed; and
monitor means for detecting changes in said detection signal resulting from the entry or movement of an intruder in said zone of protection, and for generating a signal in response thereto, said monitor means detecting changes in said detection signal exceeding a predetermined amount and in response thereto switching said comparator means between said slow response mode and said fast response mode.

31. An intrusion detector system comprising a transmitter and a receiver, said transmitter having:
transmitter clock means for generating a transmitter clock at a selected clock frequency;
transmitter pseudorandom code generator means responsive to said transmitter clock for generating a predetermined transmitter pseudorandom code sequence signal;
source means for generating an electromagnetic signal;
modulator means for spread-spectrum modulating said electromagnetic signal in accordance with said transmitter pseudorandom code sequence signal; and
transmitter antenna means for transmitting said modulated electromagnetic signal through a desired zone of protection;
and said receiver having:
receiver antenna means for receiving said modulated electromagnetic signal after being transmitted through said zone of protection;
demodulator means for detecting and demodulating said modulated electromagnetic signal to recover said transmitter pseudorandom code sequence signal;
receiver clock means for generating a receiver clock at said selected clock frequency from a higher frequency reference clock;
receiver pseudorandom code generator means responsive to said receiver clock for generating a receiver pseudorandom code sequence signal corresponding to said transmitter pseudorandom code sequence signal;

detector means for comparing said received transmitter pseudorandom code sequence signal to said receiver pseudorandom code sequence signal, and generating a detection signal proportional to the signal amplitude of said received transmitter pseudorandom code sequence signal when said receiver pseudorandom code sequence signal matches said received transmitter pseudorandom code sequence signal;

monitor means for detecting changes in said detection signal resulting from the entry or movement of an intruder in said zone of protection, and for generating a signal in response thereto;

phase detector means for comparing the phase of said received transmitter pseudorandom code sequence signal to the phase of said receiver pseudorandom code sequence signal, and generating a phase error signal proportional to the phase error between said compared signals; and control means responsive to said phase error signal for bringing said receiver pseudorandom code sequence signal into phase synchronization with said received transmitter pseudorandom code sequence signal.

32. The intrusion detector system of claim 31, wherein said control means phase synchronizes said compared signals by phase shifting said receiver psuedorandom code sequence signal relative to said received transmitter pseudorandom code sequence signal, said control means selectively synchronizing said compared signals by shifting said compared signals through varying the clock frequency of said receiver clock means responsive to said phase error signal, and by adding or removing one or more pulses of said reference clock to phase shift said receiver pseudorandom code sequence signal relative to said received transmitter pseudorandom code sequence signal's upon said phase error signal exceeding a predetermined phase error signal.

33. An intrusion detector system comprising a transmitter and a receiver, said transmitter having:

oscillator means for generating a transmitter reference clock;

frequency divider means for frequency dividing said transmitter reference clock into a plurality of transmitter clocks at different frequencies;

frequency selecting means for selecting one of said plurality of transmitter clocks as an operating transmitter clock, said frequency selecting means being programmable to select a predetermined one of said plurality of transmitter clocks;

transmitter pseudorandom code generator means responsive to said operating transmitter clock for generating a plurality of transmitter pseudorandom code sequence signals;

code selecting means for selecting one of said plurality of transmitter pseudorandom code sequence signals as an operating transmitter code sequence signal, said code selecting means being programmable to select a predetermined one of said plurality of transmitter pseudorandom code sequence signals;

source means for generating an electromagnetic signal;

modulator means for spread-spectrum modulating said electromagnetic signal in accordance with said transmitter pseudorandom code sequence signal; and transmitter antenna means for transmitting said modulated electromagnetic signal through a desired zone of protection;

and said receiver having:

receiver antenna means for receiving said modulated electromagnetic signal after being transmitted through said zone of protection;

demodulator means for detecting and demodulating said modulated electromagnetic signal to recover said transmitter pseudorandom code sequence signal;

ocillator means for generating a receiver reference clock;

frequency divider means for frequency dividing said receiver reference clock into a plurality of receiver clocks at different frequencies, said frequencies corresponding to the frequencies of said transmitter clocks;

frequency selecting means for selecting one of said plurality of receiver clocks as an operating receiver clock, said frequency selecting means being programmable to select a predetermined one of said plurality of receiver clocks corresponding to said operating transmitter clock;

receiver pseudorandom code generator means responsive to said receiver clock for generating a plurality of receiver pseudorandom code sequence signals corresponding to said transmitter pseudorandom code sequence signals;

code selecting means for selecting one of said plurality of receiver pseudorandom code sequence signals as an operating receiver code sequence signal, said code selecting means being programmable to select a predetermined one of said plurality of receiver pseudorandom code sequence signals corresponding to said operating transmitter code sequence signal;

detector means for comparing said received transmitter pseudorandom code sequence signal to said receiver pseudorandom code sequence signal, and generating a detection signal proportional to the signal amplitude of said received transmitter pseudorandom code sequence signal when said receiver pseudorandom code sequence signal matches said received transmitter pseudorandom code sequence signal; and monitor means for detecting changes in said detection signal resulting from the entry or movement of an intruder in said zone of protection, and for generating a signal in response thereto.

34. An intrusion detector system comprising a transmitter and a receiver, said transmitter having:

oscillator means for generating a transmitter reference clock;

frequency divider means for frequency dividing said transmitter reference clock into a plurality of transmitter clocks at different frequencies;

frequency selecting means for selecting one of said plurality of transmitter clocks as an operating transmitter clock, said frequency selecting means being programmable to select a predetermined one of said plurality of transmitter clocks;

pseudorandom code generator means responsive to said transmitter operating clock for generating a plurality of transmitter pseudorandom code sequence signals;

code selecting means for selecting one of said plurality of transmitter pseudorandom code sequence signals as a transmitter operating code sequence signal, said code selecting means being programmable to select a predetermined one of said plurality of transmitter pseudorandom code sequence signals;

source means for generating an electromagnetic signal;

modulator means for spread-spectrum modulating said electromagnetic signal with said transmitter operating code sequence signal; and transmitter antenna means for transmitting said modulated electromagnetic signal through a desired zone of protection;

and said receiver having:

receiver antenna means for receiving said modulated electromagnetic signal after being transmitted through said zone of protection;

demodulator means for detecting and demodulating said modulated electromagnetic signal to recover said transmitter operating code sequence signal;

amplifier means for adjustably amplifying said received transmitter operating code sequence signal, said amplifier means having a wide band characteristic to pass said received transmitter operating code sequence signal;

oscillator means for generating a receiver reference clock;

frequency divider means for frequency dividing said receiver reference clock into a plurality of receiver clocks at different frequencies, said frequencies corresponding to the frequencies of said transmitter clocks;

frequency selecting means for selecting one of said plurality of receiver clocks as an operating receiver clock, said frequency selecting means being programmable to select a predetermined one of said plurality of receiver clocks corresponding to said transmitter operating clock;

pseudorandom code generator means responsive to said receiver operating clock for generating a plurality of receiver psuedorandom code sequence signals corresponding to said transmitter pseudorandom code sequence signals;

code selecting means for selecting one of said plurality of receiver pseudorandom code sequence signals as a receiver operating code sequence signal, said code selecting means being programmable to select a predetermined one of said plurality of receiver pseudorandom code sequence signals corresponding to said transmitter operating code sequence signal;

synchronous detector means for synchronously comparing said amplified received transmitter operating code sequence signal to said receiver operating code sequence signal, and when matching and in synchronization, generating a detection signal proportional to the signal amplitude of said received transmitter operating code sequence signal;

detector gain control means for comparing said detection signal to a reference signal and generating an automatic gain control signal proportional to the difference between said detection signal and said reference signal, said automatic gain control signal being fed back to said amplifier means to adjustably control the gain of said amplifier means to adjust said detection signal toward said reference signal, said detector gain control means being switchable between a fast response mode operable for rapid gain control and a slow response mode operable for slow gain control, said slow response mode being sufficiently slow to prevent said automatic gain control signal from significantly adjusting the gain of said amplifier means responsive to a change in said detection signal relative to said reference voltage resulting from the entry or movement of an intruder in said zone of protection having a predetermined size and speed;

window detector means for detecting changes in said detection signal exceeding a predetermined amount corresponding to entry or movement of an intruder in said zone of protection, and for generating a signal in response thereto, said window detector means further switching said detector gain control means from said slow response mode to said fast response mode upon said detection signal's exceeding said predetermined amount, and switching said detector gain control means from said fast response mode to said slow response mode upon said detection signal's returning to within said predetermined amount;

phase detector means for comparing the phase of said received transmitter operating code sequence signal to the phase of said receiver operating code sequence signal, and generating a phase error signal proportional to the phase error between said compared signals; and control means responsive to said phase error signal for bringing said receiver operating code sequence signal into phase synchronization with said received transmitter operating code sequence signal, said control means selectively controlling said receiver reference clock by varying the frequency of said receiver reference clock in response to said phase error signal, and by adding or removing one or more pulses of said receiver clock to phase shift said receiver operating code sequence signal relative to said received transmitter operating code sequence signal's upon said phase error signal exceeding a predetermined phase error signal.

35. The intrusion detector system of claim 34 wherein said predetermined amount is defined by an upper threshold limit and a lower threshold limit, said detection signal's being within said upper and lower threshold limits when no intruder is detected within said zone of protection, and said detection signals's exceeding said upper or lower threshold limit upon entry or movement of an intruder in said zone of protection.

36. The intrusion detector system of claim 35, further including audio means for generating an audio signal with a frequency and amplitude variable in response to changes in said detection signal.

37. The intrusion detector system of claim 36 wherein said audio signal increases in frequency in proportion to one of said detection signal's increasing or decreasing, and decreases in frequency in proportion to the other of said detection signal's increasing or decreasing.

38. The intrusion detector system of claim 37 wherein said audio signal is changed to a predetermined frequency and increased in amplitude upon said detector signal's increasing or decreasing by said predetermined amount.

39. An intrusion detector system comprising a transmitter and a receiver, said transmitter having:

transmitter clock means for generating a transmitter clock at a selected clock frequency;

transmitter code generator means responsive to said transmitter clock for generating a plurality of transmitter code sequence signals;

code selecting means for selecting one of said plurality of transmitter code sequence signals as an operating transmitter code sequence signal, said code selecting means being programmable to select a predetermined one of said plurality of transmitter code sequence signals, said plurality of transmitter code sequences each having a repetition rate outside of the information bandwidth derived from detection of an intruder in a desired zone of protection;

source means for generating an electromagnetic signal;

modulator means for spread-spectrum modulating said electromagnetic signal in accordance with said operating transmitter code sequence signal; and transmitter antenna means for transmitting said modulated electromagnetic signal through said zone of protection;

and said receiver having:

receiver antenna means for receiving said modulated electromagnetic signal after being transmitted through said zone of protection;

demodulator means for detecting and demodulating said modulated electromagnetic signal to recover said operating transmitter code sequence signal;

receiver clock means for generating a receiver clock at said selected clock frequency;

receiver code generator means responsive to said receiver clock for generating a plurality of receiver code sequence signals corresponding to said transmitter code sequence signals;

code selecting means for selecting one of said plurality of receiver code sequence signals as an operating receiver code sequence signal, said code selecting means being programmable to select a predetermined one of said plurality of receiver code sequence signals corresponding to said operating transmitter code signal;

detector means for comparing said received operating transmitter code sequence signal to said operating receiver code sequence signal, and generating a detection signal proportional to the signal amplitude of said received operating transmitter code sequence signal when said operating receiver code sequence signal matches said received operating transmitter code sequence signal; and monitor means for detecting changes in said detection signal resulting from the entry or movement of an intruder in said zone of protection, and for generating a signal in response thereto.

40. The intrusion detector system of claim 39 wherein said transmitter clock means includes:

oscillator means for generating a transmitter reference clock;

frequency divider means for frequency dividing said transmitter reference clock into a plurality of transmitter clocks at different frequencies, said plurality of transmitter clocks each have a clock rate outside the information bandwidth derived from detection of an intruder in said zone of protection; and frequency selecting means for selecting one of said plurality of transmitter clocks as an operating transmitter clock, said frequency selecting means being programmable to select a predetermined one of said plurality of transmitter clocks; and said receiver clock means includes:

oscillator means for generating a receiver reference clock;

frequency divider means for frequency dividing said receiver reference clock into a plurality of receiver clocks at different frequencies, said frequencies corresponding to the frequencies of said transmitter clocks; and frequency selecting means for selecting one of said plurality of receiver clocks as an operating receiver clock, said frequency selecting means being programmable to select a predetermined one of said plurality of receiver clocks corresponding to said operating transmitter clock.

41. The method for detecting an intruder in a desired zone of protection, comprising:

generating a predetermined transmitter pseudorandom code sequence signal;

generating an electromagnetic signal;

spread-spectrum modulating said electromagnetic signal in accordance with said transmitter pseudorandom code sequence signal;

transmitting said modulated electromagnetic signal through the desired zone of protection;

receiving said modulated electromagnetic signal after being transmitted through said zone of protection;

detecting and demodulating said modulated electromagnetic signal to recover said transmitter pseudorandom code sequence signal;

generating a receiver pseudorandom code sequence signal corresponding to said transmitter pseudorandom code sequence signal;

comparing said received transmitter pseudorandom code sequence signal to said receiver pseudorandom code sequence signal;

generating a detection signal proportional to the signal amplitude of said received transmitter pseudorandom code sequence signal when said receiver pseudorandom code sequence signal matches said received transmitter pseudorandom code sequence signal;

detecting changes in said detection signal resulting from the entry or movement of an intruder in said zone of protection; and generating a signal in response to said detected changes in said detection signal.

42. The method of claim 41, further including:

adjustably amplifying said received transmitter pseudorandom code sequence signal;

comparing said detection signal to a reference signal;

generating an automatic gain control signal proportional to the difference between said detection signal and said reference signal; and using said automatic gain control signal to adjustably control the amplification of said received transmitter pseudorandom code sequence signal to adjust said detection signal toward said reference signal.

43. The method of claim 42 further including switching between a fast response mode operable for rapid gain control and a slow response mode operable for slow gain control for, adjustably controlling said amplification, said slow response mode being sufficiently slow to prevent said automatic gain control signal from significantly adjusting the amplification of said received transmitter pseudorandom code sequence signal responsive to a change in said detection signal relative to said reference voltage resulting from the entry or movement of an intruder in said zone of protection having a predetermined size and speed; and wherein changes in said detection signal resulting from the entry or movement of an intruder are detected if the change exceeds a predetermined amount and in response thereto said amplification is switched from said slow response mode to said fast response mode.

44. The method of claim 41, further including:

comparing the phase of said received transmitter pseudorandom code sequence signal to the phase of said receiver pseudorandom code sequence signal, and generating a phase error signal proportional to the phase error between said compared signals; and bringing said receiver pseudorandom code sequence signal into phase synchronization with said received transmitter pseudorandom code sequence signal responsive to said phase error signal.

45. The method of claim 44 wherein said phase synchronizing of said compared signals is accomplished by phase shifting said receiver pseudorandom code sequence signal relative to said received transmitter pseudorandom code sequence signal.

46. The method of claim 45 wherein phase shifting of said compared signals is accomplished by varying the clock frequency of said receiver clock means responsive to said phase error signal.

47. The method of claim 44 wherein said receiver pseudorandom code sequence signal is generated responsive to a receiver clock generated from a higher frequency reference clock, and said phase synchronizing of said compared signals is accomplished by adding or removing one or more pulses of said reference clock to phase shift said receiver pseudorandom code sequence signal relative to said received transmitter pseudorandom code sequence signal's upon said phase error signal exceeding a predetermined phase error signal.

48. The method of claim 41 further including:
generating a transmitter reference clock;
frequency dividing said transmitter reference clock into a plurality of transmitter clocks at different frequencies;
selecting one of said plurality of transmitter clocks as an operating transmitter clock in response to which said transmitter pseudorandom code sequence signal is generated;
generating a receiver reference clock;
frequency dividing said receiver reference clock into a plurality of receiver clocks at different frequencies, said frequencies corresponding to the frequencies of said transmitter clocks; and
selecting one of said plurality of receiver clocks corresponding to said operating transmitter clock, as an operating receiver clock, in response to which said receiver pseudorandom code sequence signal is generated.

49. The method of claim 41 further including:
generating a plurality of transmitter pseudorandom code sequence signals;
selecting one of said plurality of transmitter pseudorandom code sequence signals for use as said predetermined transmitter pseudorandom code sequence signal;
generating a plurality of receiver pseudorandom code sequence signals corresponding to said plurality of transmitter pseudorandom code sequence signals; and
selecting one of said plurality of receiver pseudorandom code sequence signals corresponding to said selected predetermined transmitter pseudorandom code sequence signal for use as said receiver pseudorandom sequence signal.

50. The method of claim 41, further including generating an audio signal with a frequency and amplitude variable in response to changes in said detection signal.

51. The method of claim 50 further including changing said audio signal in frequency in proportion to changes in said detection signal.

52. The method of claim 51 wherein said audio signal is changed to a predetermined frequency and increased in amplitude upon said detector signal's changing by a predetermined amount corresponding to entry or movement of an intruder in said zone of protection.

* * * * *